United States Patent
Sanfelice et al.

(10) Patent No.: US 11,923,969 B2
(45) Date of Patent: Mar. 5, 2024

(54) HYNTP: AN ADAPTIVE HYBRID NETWORK TIME PROTOCOL FOR CLOCK SYNCHRONIZATION IN HETEROGENEOUS DISTRIBUTED SYSTEM

(71) Applicant: The Regents of the University of California, Oakland, CA (US)

(72) Inventors: Ricardo G. Sanfelice, Santa Cruz, CA (US); Marcello Guarro, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 205 days.

(21) Appl. No.: 17/361,913

(22) Filed: Jun. 29, 2021

(65) Prior Publication Data

US 2021/0409139 A1 Dec. 30, 2021

Related U.S. Application Data

(60) Provisional application No. 63/045,603, filed on Jun. 29, 2020.

(51) Int. Cl.
*H04J 3/06* (2006.01)
*G06F 17/14* (2006.01)
(Continued)

(52) U.S. Cl.
CPC ............ *H04J 3/0667* (2013.01); *G06F 17/14* (2013.01); *G06F 17/16* (2013.01); *G06N 20/00* (2019.01);
(Continued)

(58) Field of Classification Search
CPC ........ H04J 3/0667; H04J 3/067; H04J 3/1664; G06N 20/00; G06F 17/14; G06F 17/16; H04L 7/0016
See application file for complete search history.

(56) References Cited

U.S. PATENT DOCUMENTS 10,795,403 B2 * 10/2020 Falk .......................... G06F 1/14
11,543,783 B2 * 1/2023 Bhattacharya ........ G01S 19/256
(Continued)

OTHER PUBLICATIONS

Guarro et al., "HyNTP: A Distributed Hybrid Algorithm for Time Synchronization". Technical Report, Hybrid Systems Laboratory, Department of Computer Engineering; University of California, Santa Cruz, May 18, 2021, 42 pages.

*Primary Examiner* — Chandrahas B Patel
(74) *Attorney, Agent, or Firm* — GATES & COOPER LLP

(57) ABSTRACT

A distributed hybrid algorithm that synchronizes the time and rate of a set of clocks connected over a network. Clock measurements of the nodes are given at aperiodic time instants and the controller at each node uses these measurements to achieve synchronization. Due to the continuous and impulsive nature of the clocks and the network, we introduce a hybrid system model to effectively capture the dynamics of the system and the proposed hybrid algorithm. Moreover, the hybrid algorithm allows each agent to estimate the skew of its internal clock in order to allow for synchronization to a common timer rate. We provide sufficient conditions guaranteeing synchronization of the timers, exponentially fast. Numerical results illustrate the synchronization property induced by the algorithm as well as its performance against comparable algorithms from the literature.

19 Claims, 12 Drawing Sheets

(51) Int. Cl.
 *G06F 17/16* (2006.01)
 *G06N 20/00* (2019.01)
 *H04J 3/16* (2006.01)
 *H04L 7/00* (2006.01)

(52) U.S. Cl.
 CPC ............ *H04J 3/067* (2013.01); *H04J 3/1664* (2013.01); *H04L 7/0016* (2013.01)

(56) References Cited

U.S. PATENT DOCUMENTS

2020/0119825 A1\* 4/2020 Lin .................... H04W 72/0446
2020/0162179 A1\* 5/2020 Yang ..................... H04J 3/0697

\* cited by examiner

HYNTP: AN ADAPTIVE HYBRID NETWORK TIME PROTOCOL FOR CLOCK SYNCHRONIZATION IN HETEROGENEOUS DISTRIBUTED SYSTEM

CROSS REFERENCE TO RELATED APPLICATIONS

This application claims the benefit under 35 U.S.C. Section 119(e) of and commonly-assigned U.S. Provisional Patent Application Ser. No. 63/045,603, filed on Jun. 29, 2020, by Ricardo G. Sanfelice and Marcello Guarro, entitled "HyNTP: AN ADAPTIVE HYBRID NETWORK TIME PROTOCOL FOR CLOCK SYNCHRONIZATION IN HETEROGENEOUS DISTRIBUTED SYSTEM"; which application is incorporated by reference herein.

STATEMENT REGARDING FEDERALLY SPONSORED RESEARCH AND DEVELOPMENT

This invention was made with Government support under Grant No. CNS 1544396, awarded by the National Science Foundation and the Airforce Office of Scientific Research Grant No. FA9550-19-1-0053. The Government has certain rights in the invention.

BACKGROUND OF THE INVENTION

1. Field of the Invention

The present disclosure relates to methods and systems for synchronizing clocks.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

Since the advent of asynchronous packet-based networks in communication and information technology, the topic of clock synchronization has received significant attention due to the temporal requirements of packet-based networks for the exchange of information. In recent years, as distributed packet based networks have evolved in terms of size, complexity, and, above all, application scope, there has been a growing need for new clock synchronization schemes with tractable design conditions to meet the demands of these evolving networks.

Distributed applications such as robotic swarms, automated manufacturing, and distributed optimization rely on precise time synchronization among distributed agents for their operation; see [1]. For example, in the case of distributed control and estimation over networks, the uncertainties of packet based network communication requires timestamping of sensor and actuator messages in order to synchronize the information to the evolution of the dynamical system being controlled or estimated. Such a scenario is impossible without the existence of a common timescale among the non-collocated agents in the system. In fact, the lack of a shared timescale among the networked agents can result in performance degradation that can destabilize the system; see [2]. Moreover, one cannot always assume that consensus on time is a given, especially when the network associated to the distributed system is subject to perturbations such as noise, delay, or jitter. Hence, it is essential that these networked systems utilize clock synchronization schemes that establish and maintain a common timescale for their algorithms.

For many networked control system settings, each agent in the system is fitted with its own internal hardware clock and one or more software clocks that inherits the dynamics of the hardware clock. In an ideal scenario, the i-th agent in the system would have a clock $\tau_i \in \mathbb{R}_{\geq 0}$ such that $\tau_i(t)=t$, where t is the global or real time. However, many hardware clocks utilize quartz-crystal or MEMS oscillators, susceptible to manufacturing imperfections and environmental factors that affect oscillator frequency; see [3] and [4]. Due to the variability in oscillator frequency, one generally considers the continuous-time dynamics of the i-th hardware clock node given by $$\dot{\tau}_i = a_i$$

where $a_i \in \mathbb{R}$ defines the clock's rate of change. Solving the differential equation gives the following relationship to the ideal clock or real time reference t:

$$\tau_i(t) = a_i t + \tau_i(0)$$

where the initial condition $\tau_i(0)$ gives the offset from t. For a network of n agents, the notion of clock synchronization can be defined as the state of the networked system such that $\tau_i = \tau_j$ for all $i,j \in \{1,2,\ldots,n\}$, $i \neq j$.

In an ideal setting with no delay and identical clock rates (or skews), synchronization between two nodes, Node 1 and Node 2, can be achieved by the following simple reference-based algorithm. Node 1 sends its time to Node 2. Node 2 calculates its offset relative to 1. Node 2 applies the offset correction to its clock. For the case of non-identical clock skews, a pair of measurements from Node 1 would allow Node 2 to calculate its relative skew $$\frac{a_1}{a_2}$$

and apply a correction accordingly. In a realistic setting, however, network communication between nodes is subject to a variety of delays to which such simple reference-based algorithms are nonrobust; see [5]. Moreover, these algorithms become cumbersome in terms of network utilization and computation as the number of nodes on the network increases.

The seminal Networking Time Protocol (NTP) presented in [6] mitigates these challenges through the implementation of a centralized algorithm. In particular, the networked agents in the system synchronize to a known reference that is either injected or provided by an elected leader agent. The effects of communication delay are mitigated via assumptions on the round-trip delay that occurs in the communication of any two nodes on the network. Conversely, other centralized approaches, such as those in [7] and [8], assume the communication delay to be negligible and instead utilize least squares minimization to estimate the errors in the offset and rates of change between the synchronizing nodes and the elected reference agent. Unfortunately, these approaches suffer robustness issues when communication with the reference node is lost or if the random delays in the transmission do not follow a normal distribution, see [3]. Moreover, algorithms like NTP were not designed for dynamic network topologies as they rely on predefined network hierarchies that define the relationships between the reference nodes and their children. Any change to the topology requires a reconstruction of the hierarchy adding considerable delay to the synchronization of the clocks.

Recently, the observed robustness issues in the centralized protocols have motivated leader-less, consensus-based approaches by leveraging the seminal results on networked consensus in [9], [10], and [11]. In particular, the works of [1], [12], [13], and, more recently, [14] employ average consensus to give asymptotic results on clock synchronization under asynchronous and asymmetric communication topology. Unfortunately, a high number of iterations of the algorithm is often required before the desired synchronization accuracy is achieved. Moreover, the constraint on asymmetric communication precludes any results guaranteeing stability or robustness. Lastly, these approaches suffer from complexity in both computation and memory allocation that may be unfit for certain applications.

The work in [15] also considers a consensus-based approach by using a controller that uses a proportional gain to compensate for the clock rates and an integrator gain acting on an auxiliary control state that compensates for the clock offsets. Though the solution in [15] provides faster convergence than the other approaches using average consensus, the algorithm assumes periodic synchronous communication of the nodes. This assumption is relaxed in [16] by considering asynchronous communication events. The authors in [17] consider a similar relaxation but also relax assumptions on the graph structure. However, in both [16] and [17] the clocks are slower to converge compared to the synchronous communication setting. Still, both synchronous and asynchronous scenarios require a large number of iterations before synchronization is achieved. Moreover, the algorithm subjects the clocks to significant non-smooth adjustments in clock rate and offset that may prove undesirable in certain application settings. What is needed then, are improved methods for synchronizing clocks. The present disclosure satisfies this need.

SUMMARY OF THE INVENTION

The lack of performance guarantees in the aforementioned works have motivated the design of a distributed hybrid algorithm that synchronizes a set of clocks (e.g., connected over a heterogeneous network) to a common clock. The protocol uses hybrid state-feedback to synchronize the clocks of the network agents and estimate the skew of its internal clock to allow for synchronization to a common timer rate. The protocol includes design conditions that guarantee synchronization of the timers such that they converge robustly, exponentially fast, even when information is available intermittently. The synchronous or asynchronous communication protocols are robust to noise in communication or hardware tolerances. In one or more examples, the term "hybrid" as used in "hybrid algorithm" or "hybrid feedback" defines the algorithm or feedback as using data that is (1) updated at different event times and (2) continuously evolved between the event times.

Illustrative, non-exclusive examples of inventive subject matter according to the present disclosure are described in the following enumerated clauses:

1. A system, comprising:
a network of nodes each including a clock implemented in hardware;
a communication link connecting the nodes so as to share information between the nodes; and
one or more computers connected to the communication link and executing an algorithm that learns one or more skews of each of the clocks from the information, wherein the one or more skews are used to determine one or more corrective actions applied to one or more of the clocks so as to synchronize the clocks to a common clock rate.

2. The system of clause 1, wherein the algorithm learns using an estimator that estimates the skews using the information.

3. The system of clause 2, wherein the algorithm uses parameters and coordinates selected to guarantee exponentially fast and stable synchronization of the clocks to the common clock rate.

4. The system of clause 1, wherein the algorithm learns the skew and synchronizes the clocks using a closed loop hybrid state-feedback comprising:
communicating the information between a plurality of the nodes at one or more communication event times;
using the information to estimate the one or more skews of each of the clocks between the communication event times so that the estimates can be used to determine the corrective actions; and
at one or more of the communication event times, adjusting one or more clock rates of one or more of the clocks using the corrective actions so that the clocks are synchronized to the common clock rate.

5. The system of clause 1, wherein:
the communication link connects one of the nodes to one or more other ones of the nodes connected to the one of the nodes; and
the information shared across the communication link represents a comparison of the skew of the clock at the one of the nodes as compared to one or more skews of the clocks at each of the other nodes connected to the one of the nodes.

6. The system of clause 1, wherein the computers synchronize the clocks by modeling the network as a hybrid system H comprising data and using the algorithm to generate the data:

$$\mathcal{H}: \begin{cases} \dot{x} = f(x) \\ x^+ = g(x) \end{cases}$$

wherein:
x is a system state representing the skews of the clocks,
$x^+$ is the system state after receiving the information at the communication event times,
g(x) is a function describing how the system state is impulsively updated at the communication event times,
$\dot{x}$ is a time rate of change of the system state determined by the algorithm between the communication event times,
f(x) is a function describing a continuous time evolution of the system state between the communication event times, and
the algorithm determines the corrective actions required to achieve a maximal solution to the hybrid system wherein the skews of the clocks converge to zero exponentially fast and the clock rates of the clock converge to the common clock rate exponentially fast.

7. The system of clause 6, wherein the function g(x) takes into account interconnectivity of the nodes in the network and communication link shares the information between the nodes connected according to the interconnectivity.

8. The system of clause 6, wherein the computers represent the network and the interconnectivity using a digraph represented using an adjacency matrix and the function g(x) applies the adjacency matrix to the system state.

9. The system of clause 6, comprising a plurality n of the clocks, wherein:
n is an integer such that n>1,
the nodes comprise n nodes each connected to one of the clocks each identified with an integer i such that $1 \leq i \leq n$, each of the clocks connected to the $i^{th}$ node identified as the $i^{th}$ clock having a clock rate $\tau_i$ varying as a function of time according to a drift $a_i$;
one or more of the nodes connected to the $i^{th}$ node are identified with an integer k such that $1 \leq k \leq i$, each of the clocks connected to the $k^{th}$ node identified as the $k^{th}$ clock having a clock rate $\tau_k$ varying as a function of time according to a drift $a_k$; and
the one or more computers:
implement a plurality of adjustable clocks each identified with the integer i or the integer k so that the $i^{th}$ adjustable clock is connected to the $i^{th}$ clock and one or more $k^{th}$ adjustable clocks are connected the $i^{th}$ adjustable clock, the $i^{th}$ adjustable clock having an adjustable clock rate $\tilde{\tau}_i = a_i + u_i$ where $u_i$ is a control input and the $k^{th}$ adjustable clock having an adjustable clock rate $\tilde{t}_k$;
represent the network using a digraph comprising the plurality i of the nodes,
provide feedback comprising, at each of the i nodes:
receiving, at each of the communication event times, the $\tilde{t}_k$ from each of the k adjustable clocks connected to the $i^{th}$ node according to the digraph;
updating, at the plurality of communication event times, the system state and a control variable $\eta_i$, wherein the control variable $\eta_i$ is associated with $\Sigma \tilde{\tau}_i - \tilde{\tau}_k$ over all k nodes connected according to the digraph;
determining a time rate of change of the system state using a continuous-time linear function between the communication event times to obtain an estimate $\hat{a}_i$ of the drift $a_i$ of the $i^{th}$ clock; and
at each of the communication event times and for one or more of the i clocks ($1 \leq i \leq n$), determine the one of the corrective actions $u_i = \eta_i - \hat{a}_i + \alpha^*$ applied to the clock rate $\tau_i$ of the $i^{th}$ clock that reduces the drift $a_i$ so as to converge the clock rate $\tau_i$ to the common clock rate $\sigma^*$.

10. The system of clause 9, wherein:
determining the time rate of change of the system state between communication event times comprises setting:

$$\left.\begin{array}{l} \dot{u}_i = h_i \eta_i - \mu_i(\hat{\tau}_i - \tau_i^*), \dot{\eta}_i = h_i \eta_i \\ \dot{\hat{a}}_i = -\mu_i(\hat{\tau}_i - \tau_i^*), \dot{\hat{\tau}}_i = \hat{a}_i - (\hat{\tau}_i - \tau_i^*) \end{array}\right\} \tau \in [0, T_2];$$

and
updating the system state at the communication event times comprises setting:

$$\left.\begin{array}{l} u_i^+ = -\gamma_i \sum_{k \in N(i)} (\tilde{\tau}_i - \tilde{\tau}_k) - \hat{a}_i + \sigma^*, \hat{a}_i^+ = \hat{a}_i \\ \eta_i^+ = -\gamma_i \sum_{k \in N(i)} (\tilde{\tau}_i - \tilde{\tau}_k), \hat{\tau}_i^+ = \hat{\tau}_i \end{array}\right\} \tau = 0$$

where h, μ and γ are parameters set to aid convergence of the clock rate $\tau_i$ to the common clock rate $\sigma^*$, $e_i - e_k = \tilde{\tau}_i - \tilde{\tau}_k$, and $u_i$, $\eta_i$, $\tau_i$, $\hat{a}_i$ and $\tilde{\tau}_k$ are variables representing the system state.

11. The system of clause 9, wherein the system state is represented in a coordinate system wherein the f(x) and the g(x) can be linearized, an interconnectivity between the nodes is represented using a Laplacian matrix, and a global exponential stability of the hybrid system's solutions in the coordinate system implies a global exponential stability of a synchronization of the clocks obtained using the algorithm.

12. The system of clause 9, wherein the system state is represented in the coordinate system wherein the system state includes error variables representing one or more errors in one or more estimates of the skews.

13. The system of clause 12, wherein the system state is represented in the coordinate system such that $x = x_\varepsilon$, $f(x) = f_\varepsilon(x_\varepsilon)$, and $g(x) = G_\varepsilon(x_\varepsilon)$ and:

$$f_\varepsilon(x_\varepsilon) := \begin{bmatrix} \eta + \varepsilon_a \\ h\eta \\ \mu \varepsilon_\tau \\ -\varepsilon_\tau - \varepsilon_a \\ -1 \end{bmatrix}, G_\varepsilon(x_\varepsilon) := \begin{bmatrix} e \\ -\gamma \mathcal{L} e \\ \varepsilon_a \\ \varepsilon_\tau \\ [T_1, T_2] \end{bmatrix}$$

where L is the Laplacian matrix obtained from the adjacency matrix,
$\varepsilon_a$ represents the error in the estimate of the $i^{th}$ clock's drift $a_i$ in the coordinate system,
$\varepsilon_\tau$ represents the error in the estimate of the $i^{th}$ clock's state $\tau_i$ in the coordinate system, and
$[T_1, T_2]$ is the time interval between the communication events $T_1$ and $T_2$.

14. The system of clause 9, wherein the communication event times are aperiodic or intermittent.

15. The system of clause 9, wherein the nodes each include a device including one of the clocks, and each of the devices comprise at least one machine selected from a robot, a vehicle, a sensor, a second computer, an actuator, an intelligent agent, a device using distributed optimization, or a smart device in one or more smart buildings.

16. The system of clause 1, wherein the nodes each include a device including one of the clocks, and each of the devices comprise at least one machine selected from performing automated manufacturing, devices controlled by a control system, devices used in banking, devices supplying power or controlling power distribution, or devices in an automotive or aerospace system.

17. The system of clause 16, wherein the devices are heterogeneously distributed devices and the system comprises a heterogeneously distributed system.

18. A network of clocks with aperiodic communication that utilizes a distributed hybrid controller to achieve synchronization, modeled using the hybrid systems framework.

BRIEF DESCRIPTION OF THE DRAWINGS

Referring now to the drawings in which like reference numbers represent corresponding parts throughout.

FIG. 4B shows the trajectories of the errors ei-ek for the components i∈{1, 2, 3, 4, 5} of a solution ϕ for the case where the system is subjected to communication noise $m_{ei}$, FIG. 4C shows noise on the internal clock output $m_{\tau i}$, and FIG. 4D shows noise on the clock rate reference $m_{oi^*}$.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The present invention solves the problem of heterogeneous clock synchronization over distributed networks subject to intermittent information for both synchronous and asynchronous communication protocols. The algorithm is capable of self-learning the skew parameters of the clocks of each system in the network. The invention includes concrete guidelines on how to tune the parameters of the algorithm to guarantee synchronization with the desired performance.

Figure 1:
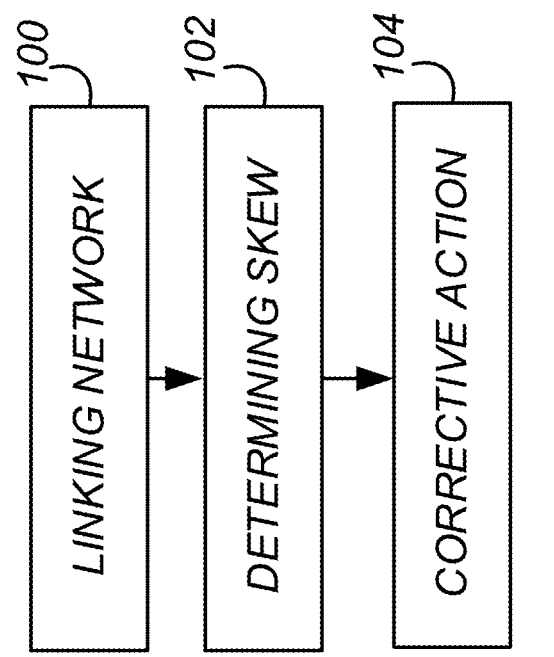
FIG. 1. Flowchart illustrating a method of making and network for synchronizing clocks.

FIG. 1 is a flowchart illustrating a computer implemented method of fabricating and/or synchronizing a network of clocks implemented in hardware (e.g., hardware oscillators). The method comprises the following steps.

Block 100 represents linking the network of the clocks so as to share information (data) between the clocks. In one example, the step comprises forming or obtaining a system including a network of nodes each including a clock implemented in hardware; forming a communication link connecting the nodes so as to share information between the nodes; and connecting one or more computers to the communication link.

Block 102 represents executing, in the one or more computers connected to the network, an algorithm that learns or estimates a skew of each of the clocks using the information. Example algorithms include, but are not limited to, machine learning or artificial intelligence algorithms trained on data or using estimators.

Block 104 represents using the skew to determine one or more corrective actions needed to synchronize the clocks and applying the corrective actions to one or more of clocks so as to synchronize the clocks to a common clock rate.

Figure 2:
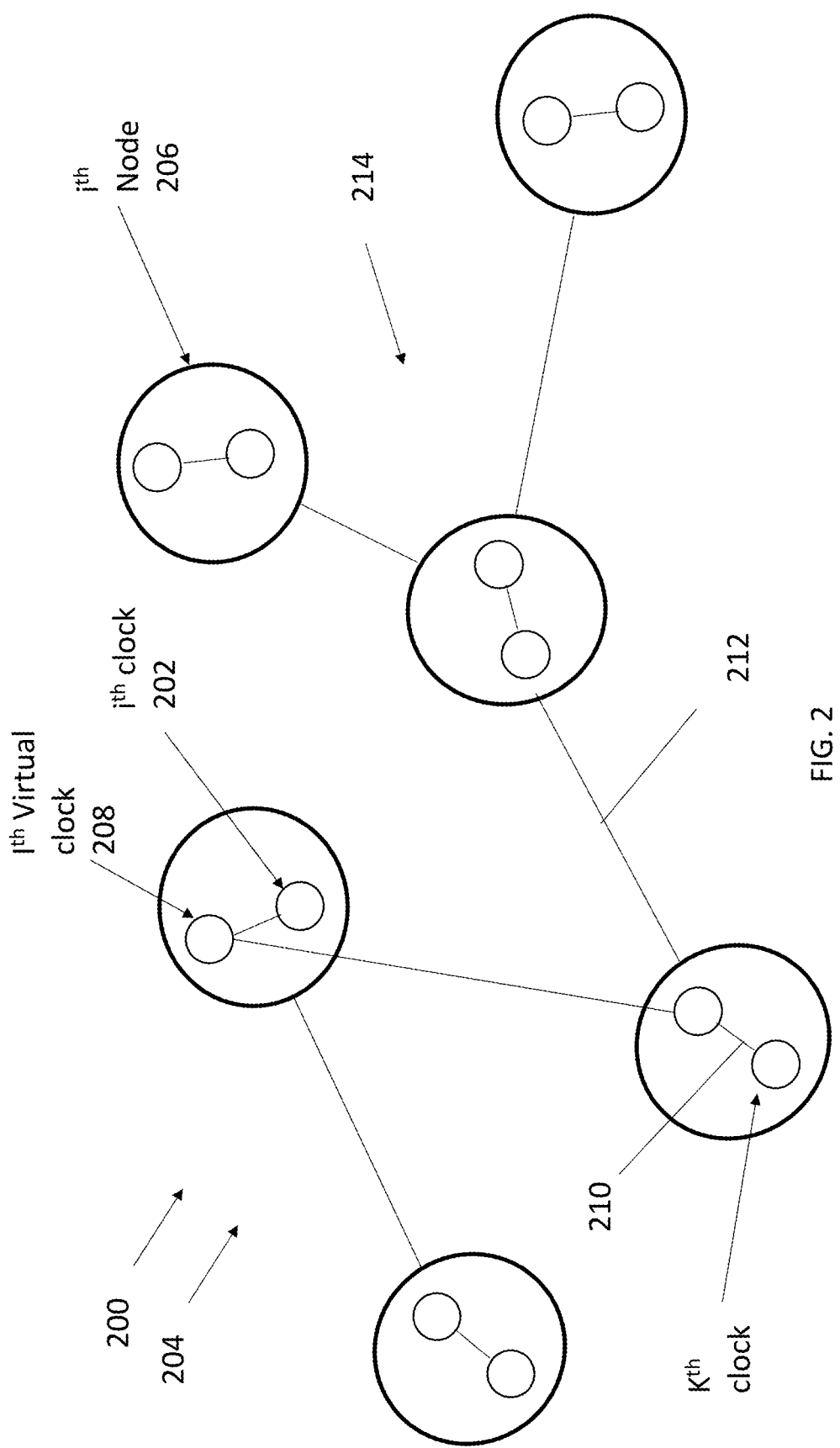
FIG. 2. Schematic illustration of a hybrid system modeling a network of clocks.

FIG. 2 illustrates an example network comprising a plurality of nodes each including one of the clocks. One or more communication links connect one of the nodes with one or more other nodes connected to the one of the nodes. The information shared across the communication link(s) represents a comparison of the skew of the clock at the one of the nodes as compared to the skew of the clocks at each of the other nodes connected to the one of the nodes.

In one or more examples, a distributed control law determines the corrective action to synchronize the clocks and an estimator determines the clock rate of each individual agent. In one or more examples, the distributed control law is implemented by controllers distributed throughout the system of nodes by applying an algorithm using information obtained from neighboring nodes. The algorithm may also have a mathematical framework that enables performance analysis and tuning of the algorithm's synchronization speed and robustness.

2. Example: Hybrid State Feedback

The algorithm may learn the skew and synchronize the clocks to the common clock rate using hybrid state-feedback. The hybrid state feedback comprises communicating information between the nodes at communication event times; using the information to estimate the skew of each of the clocks between the communication event times; and adjusting a clock rate of one or more of the clocks at one or more of the communication event times using corrective action(s) determined from the skew so that the clocks are synchronized to the common clock rate.

a. Hybrid System

The clocks are synchronized by modeling the network as a hybrid system H comprising data and using the algorithm to generate the data:

$$\mathcal{H}: \begin{cases} \dot{x} = f(x) \\ x^+ = g(x) \end{cases}$$

wherein:

x is a system state representing the skew of the clocks;

$x^+$ is the system state obtained from the information at the communication event times (a jump) and g is a function describing how the system state is impulsively updated at the communication event times; and $\dot{x}$ is the time rate of change of the system state determined by the algorithm between the communication event times and f is a function describing the continuous time evolution of the system state between the communication event times.

The function g takes into account interconnectivity of the nodes in the network and the communication of the information is between the nodes connected according to the interconnectivity. Typically, the network and the interconnectivity are modeled using a digraph represented using an adjacency matrix and the function g applies the adjacency matrix to the system state.

FIG. 2 illustrates a network 200 of clocks 202 represented as a digraph 204. The clocks are identified as n clocks, where n is an integer such that n>1. The network comprises i nodes 206 each connected to or comprising one of the clocks, wherein i is an integer such that 1≤i≤n. Each of the clocks connected to or at the $i^{th}$ node is identified as the $i^{th}$ clock having a clock rate $\tau_i$ varying as a function of time according to a drift $a_i$. One or more of the nodes connected to the $i^{th}$ node are identified with an integer k such that $1 \le k \le i$, each of the clocks connected to the $k^{th}$ node identified as the $k^{th}$ clock having a clock rate $\tau_k$ varying as a function of time according to a drift $a_k$.

In order to find solutions to the hybrid system, the computer implements a plurality of adjustable clocks 208 (e.g., implemented in software) and each identified with the integer i or the integer k so that the $i^{th}$ adjustable clock is connected via a first communication link 210 to the $i^{th}$ clock 202 and one or more $k^{th}$ adjustable clocks are connected the $i^{th}$ adjustable clock using a second communication link 212 according to the nodes in the network. The $i^{th}$ adjustable clock has clock rate $\tilde{\tau}_i$ with dynamics $$\dot{\tilde{\tau}}_i = a_i + u_i \tag{1}$$

where $u_i$ is a control input. The $k^{th}$ adjustable clock has an adjustable clock rate $\tilde{\tau}_k$.

The communication links 212 connect the nodes according to an interconnectivity 214 determined by the digraph 204.

b. Process Steps

Figure 3:
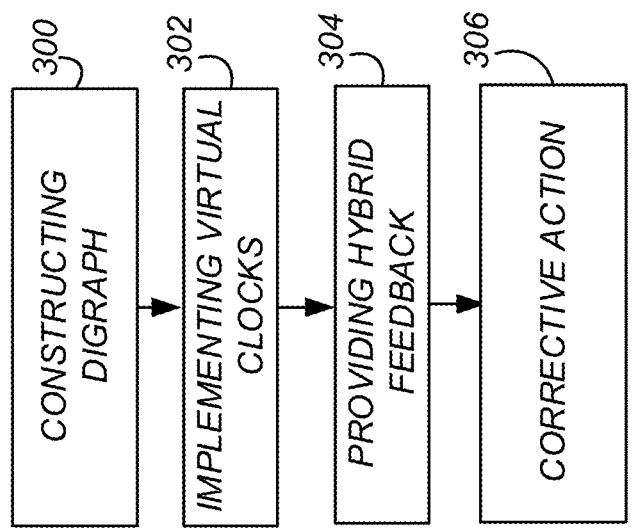
FIG. 3. Flowchart illustrating a method of synchronizing clocks using hybrid state feedback.

FIG. 3 is a flowchart illustrating the method of synchronizing the clocks using the hybrid feedback. The method comprises the following steps.

Block 300 represents constructing the digraph modeling the network, wherein the digraph comprises the plurality i of the nodes, Block 302 represents implementing the adjustable clocks in software.

Block 304 represents providing feedback comprising, at each of the i nodes:
  receiving, at each of the communication event times, the $\tilde{\tau}_k$ from each of the k adjustable clocks connected to the $i^{th}$ node according to the digraph;
  updating, at the plurality of communication event times, the system state including a control variable $\eta_i$, wherein the control variable $\eta_i$ is proportional to $\Sigma \tilde{\tau}_i - \tilde{\tau}_k$ over all k nodes connected according to the digraph; and
  calculating the time rate of change of the system state using a continuous-time linear function between the communication event times to estimate $\hat{a}_i$, an estimate of the drift $a_i$ of the $i^{th}$ clock.

Block 306 represents, at each of the communication event times and for each of i clocks, determining the corrective action $u_i = \eta_i - \hat{a}_i + \sigma^*$ applied to the clock rate $\tilde{\tau}_i$ of the $i^{th}$ clock so as to reduce the drift $a_i$ and cause convergence of the clock rate $\tilde{\tau}_i$ the to the common prespecified rate of change $\sigma^*$.

The system state is typically represented by a plurality of variables in a suitable coordinate system. In one example, the plurality of variable comprise $e_i$ (the clock rate of the adjustable clock in the new coordinate system), $u_i$, $\eta_i$, $\tau_i$, $\hat{a}_i$, and $\hat{\tau}_i$ (Estimate of $\tau_i$).

In one or more examples, determining the time rate of change of the system state between communication event times (flow dynamics f(x)) comprises setting:

$$\left. \begin{array}{l} \dot{u}_i = h_i \eta_i - \mu_i(\hat{\tau}_i - \tau_i^*), \dot{\eta}_i = h_i \eta_i \\ \dot{\hat{a}}_i = -\mu_i(\hat{\tau}_i - \tau_i^*), \dot{\hat{\tau}}_i = \hat{a}_i - (\hat{\tau}_i - \tau_i^*) \end{array} \right\} \tau \in [0, T_2] \tag{2a}$$

and updating the system state at the communication event times (jump dynamics g(x)) comprises setting:

$$\left. \begin{array}{l} u_i^+ = -\gamma_i \sum_{k \in N(i)} (\tilde{\tau}_i - \tilde{\tau}_k) - \hat{a}_i + \sigma^*, \hat{a}_i^+ = \hat{a}_i \\ \eta_i^+ = -\gamma_i \sum_{k \in N(i)} (\tilde{\tau}_i - \tilde{\tau}_k), \hat{\tau}_i^+ = \hat{\tau}_i \end{array} \right\} \tau = 0 \tag{2b}$$

where $\mu$ and $\gamma$ are parameters set to aid the convergence and $e_i - e_k = \tilde{\tau}_i - \tilde{\tau}_k$ (using e as coordinates when the system state recast in an appropriate coordinate system). In one or more examples, the change of coordinates is used to guarantee the synchronization of the clocks in an exponentially fast time frame.

In one or more examples, the system state is represented in a coordinate system wherein the system state includes error variables representing the error in the estimates of the skews.

In one or more examples, the system state is represented in a coordinate system wherein the flow and jump dynamics can be linearized, the interconnectivity between the nodes is represented using a Laplacian matrix, and global exponential stability of the set of the hybrid system's solutions in the coordinate system implies global exponential stability of the synchronization of the clocks. For example, the coordinate system is such that $x = x_\varepsilon$, $f(x) = f_\varepsilon(x_\varepsilon)$, and $G(x_\varepsilon)$ wherein:

$$f_\varepsilon(x_\varepsilon) := \begin{bmatrix} \eta + \varepsilon_a \\ h\eta \\ \mu \varepsilon_\tau \\ -\varepsilon_\tau - \varepsilon_a \\ -1 \end{bmatrix}, G_\varepsilon(x_\varepsilon) := \begin{bmatrix} e \\ -\gamma \mathcal{L} e \\ \varepsilon_a \\ \varepsilon_\tau \\ [T_1, T_2] \end{bmatrix}$$

where L is the Laplacian matrix obtained from the adjacency matrix, $\varepsilon_a$ represents the estimate of the $i^{th}$ clock's drift $a_i$ in the coordinate system, $\varepsilon_\tau$ represents the estimate of the $i^{th}$ clock's clock state $\tau_i$ in the coordinate system, and $[T_1, T_2]$ is $\hat{\tau}_i$ e time interval between the communication events $T_1$ and $T_2$.

d. Example Numerical Results

Consider five agents each comprising a clock with drift $a_i$ and adjustable clock with dynamics $$\dot{\tilde{\tau}}_i = a_i + u_i$$

over a strongly connected graph with the following adjacency matrix:

$$\mathcal{G}_A = \begin{pmatrix} 0 & 1 & 1 & 0 & 1 \\ 1 & 0 & 1 & 0 & 0 \\ 1 & 0 & 0 & 1 & 0 \\ 0 & 0 & 1 & 0 & 1 \\ 1 & 0 & 1 & 1 & 0 \end{pmatrix}$$

Given communication event times $T_1 = 0:01$ and $T_2 = 0:1$, $\sigma^* = 1$, then it can be found that, for the hybrid system represented as a matrix equation with suitable matrices P1, P2, P3 in a suitable coordinate system using the parameters $h = -1:3$, $\mu = 3$, and $\gamma = 0.125$, the maximal solutions to the hybrid system are globally exponentially stable and synchronize the clocks to the common clock rate, i.e., $$\lim_{t \to \infty} |\tilde{\tau}_i(t) - \tilde{\tau}_k(t)| = 0$$

for all i and k.

Figure 4A:
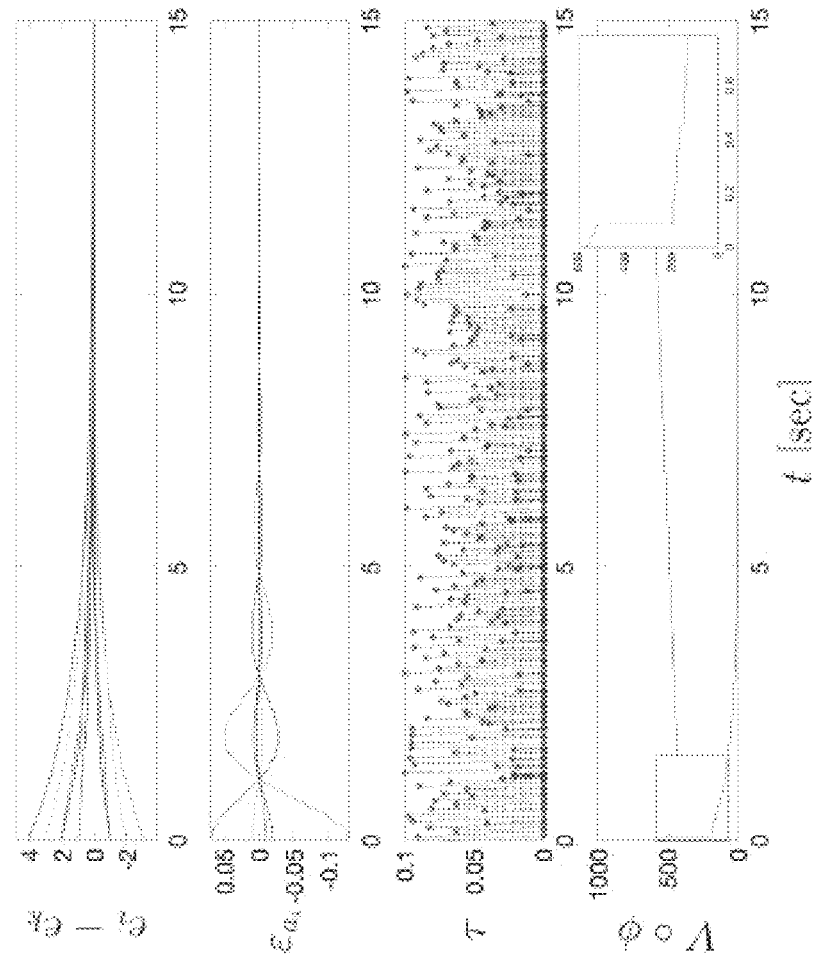
FIG. 4A. The trajectories of the solution ϕ for state component errors $e_i - e_k$, $\varepsilon_{o k}$, and τ and plot of V evaluated along the solution ϕ projected onto the regular time domain, demonstrating a numerical solution of the hybrid system and synchronization of clock rates.
Figure 4B:
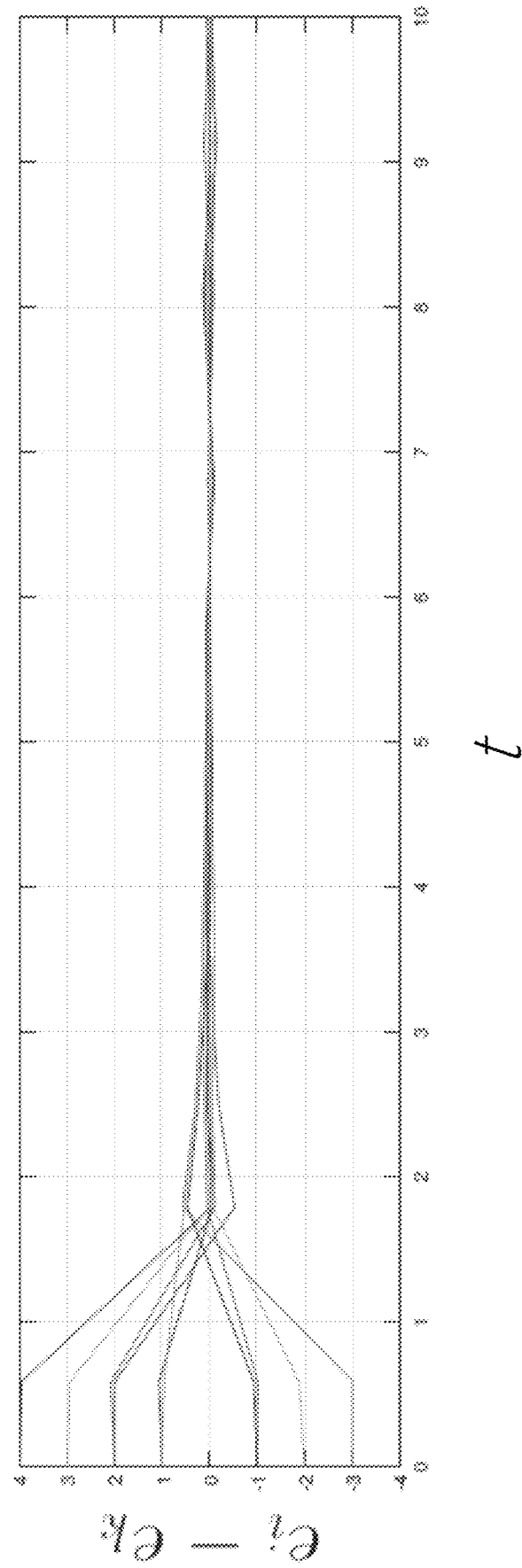
FIGS. 4B-4D. Numerical solution of the hybrid system showing synchronization of clock rates in the presence of noise.
Figure 4C:
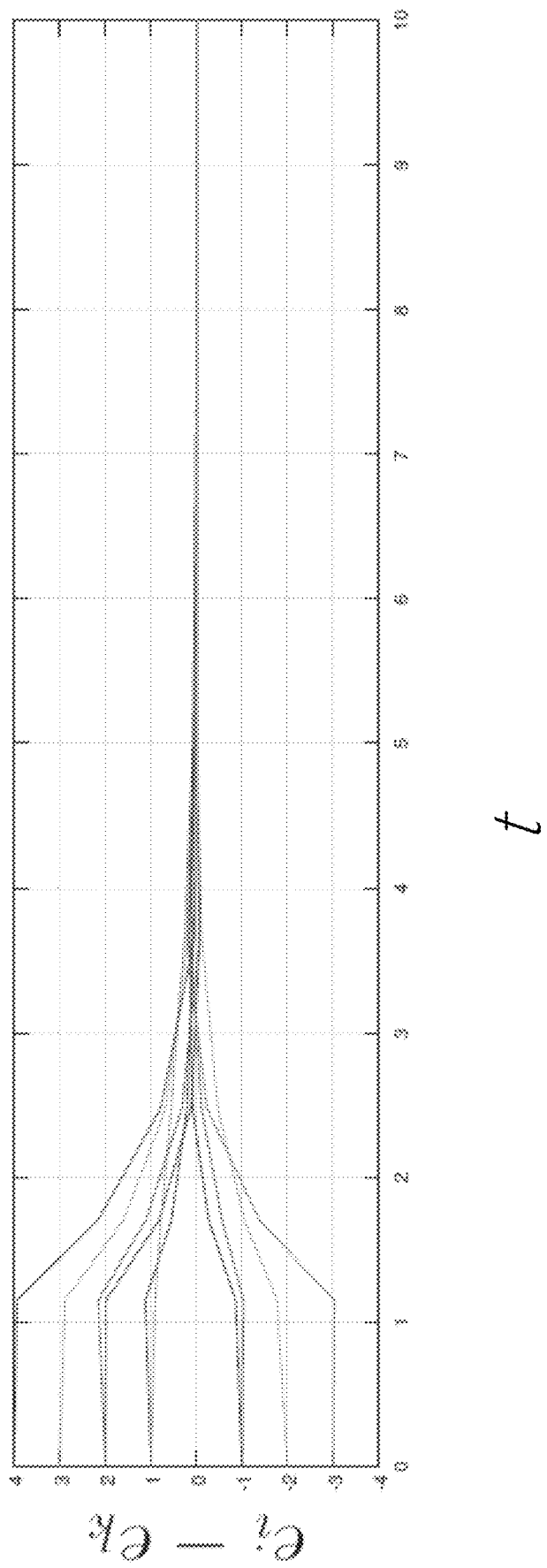
Figure 4D:
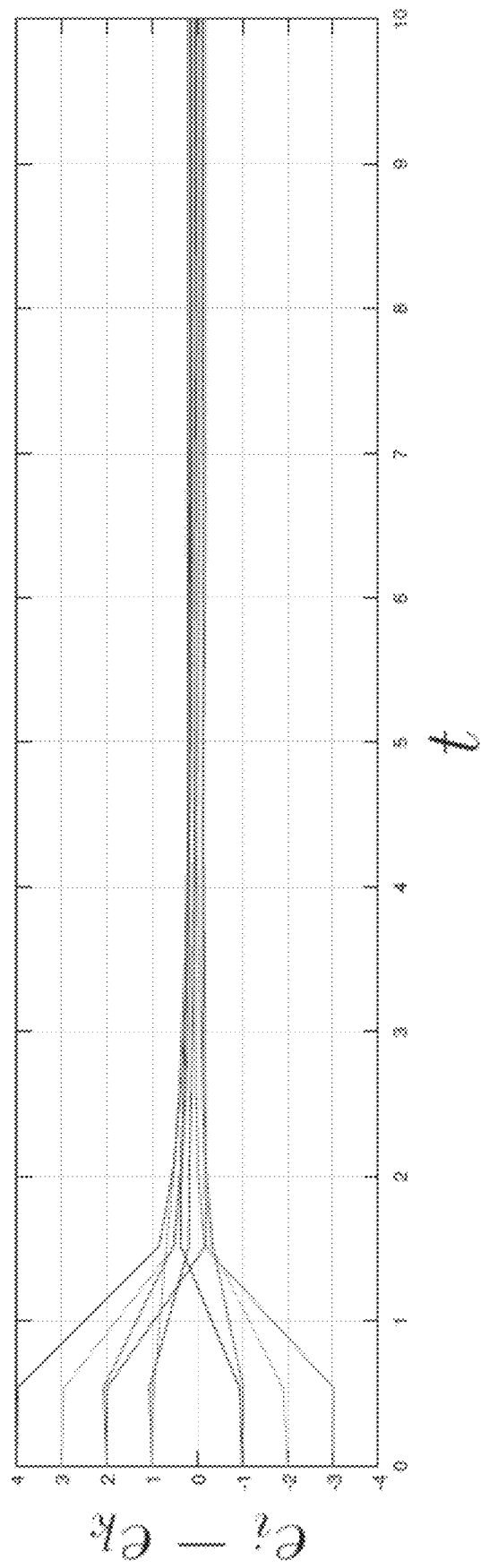
Figure 4E:
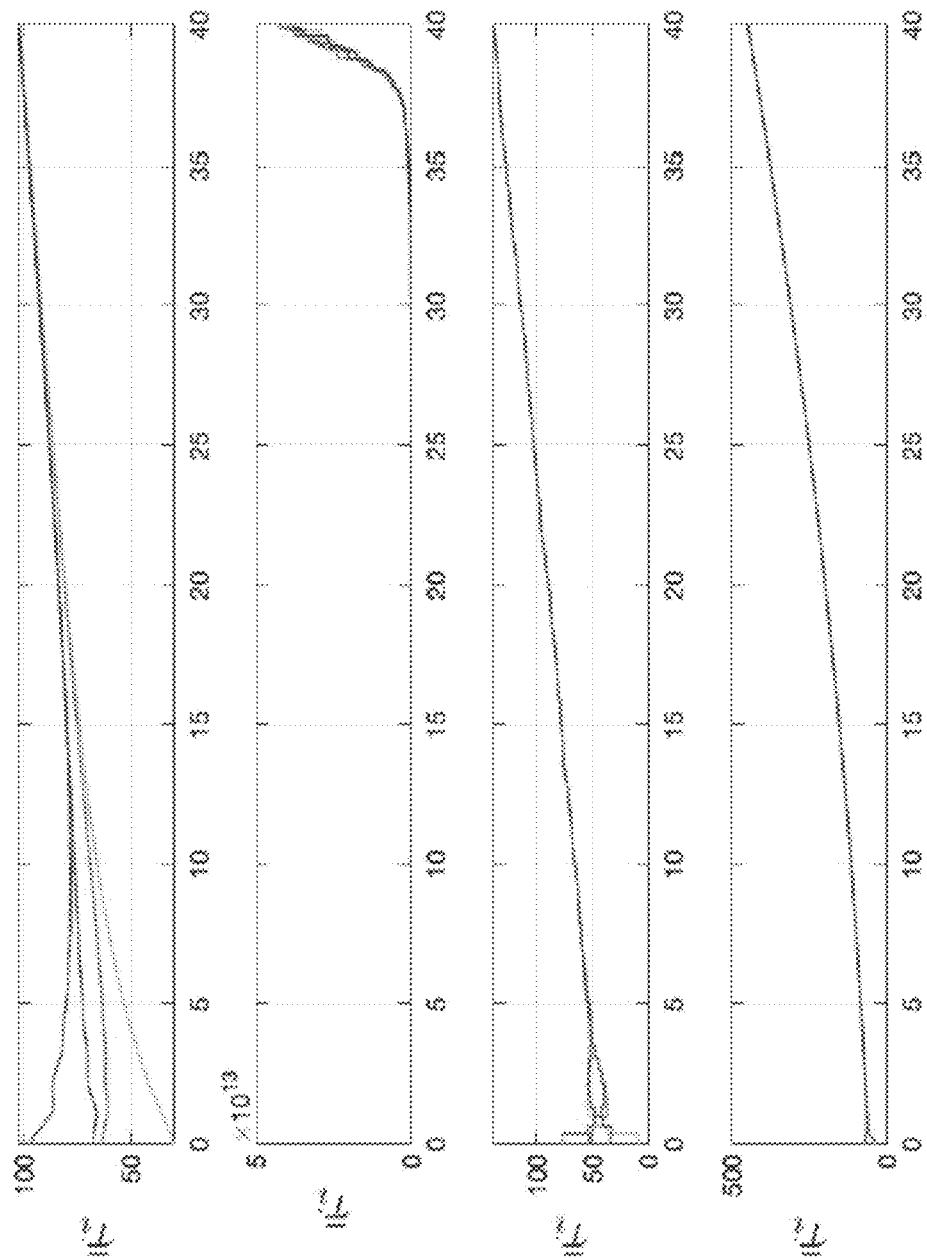
FIGS. 4E-4F. The evolution of the trajectories of the adjustable clocks $\bar{\tau}_i$ (FIG. 4E) and adjustable clock rates $\bar{a}_i$ (FIG. 4F)) for different clock synchronization algorithm. From top to bottom, HyNTP (according to one or more embodiments of the present invention), Average TimeSync, PI-Consensus, and RandSync.
Figure 4F:
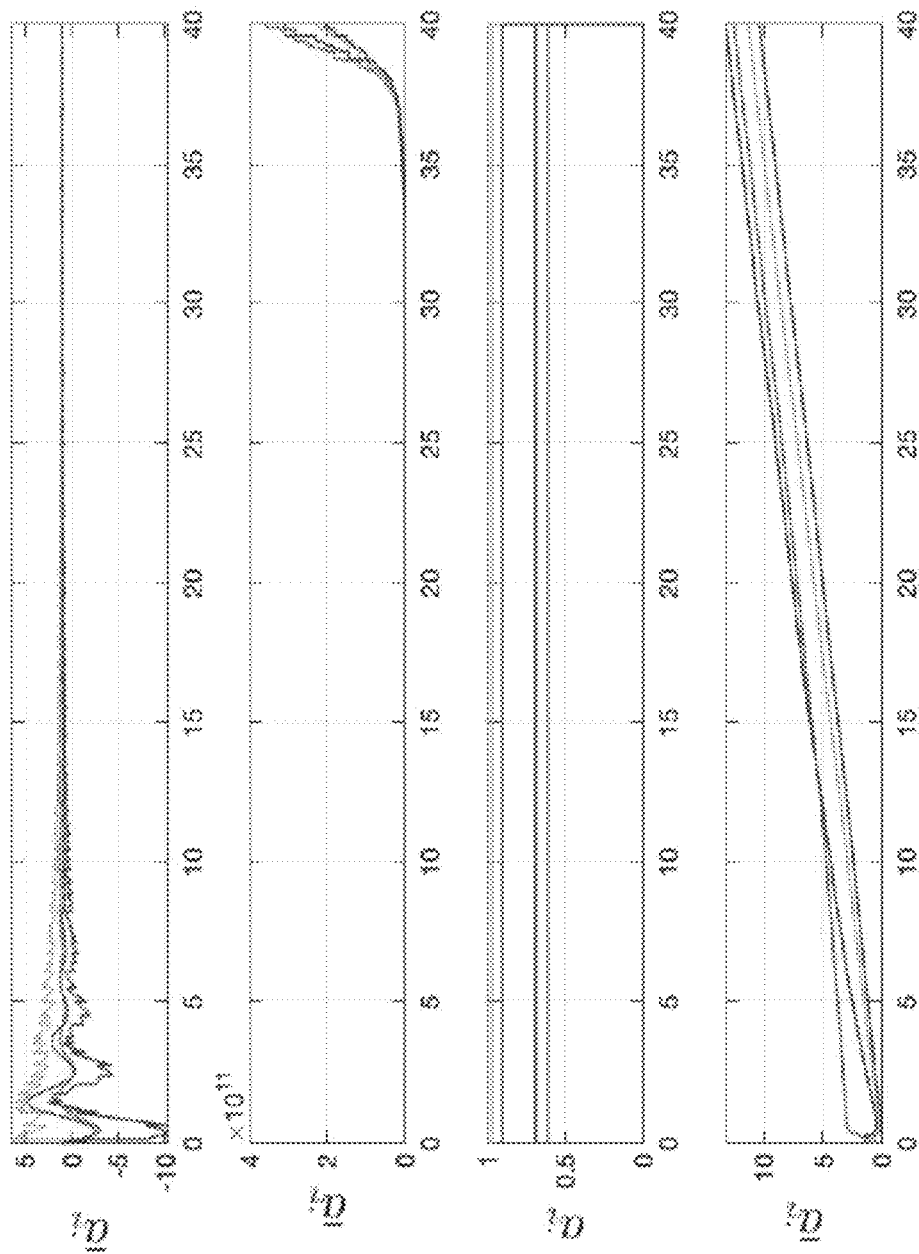

FIG. 4A plots selected variables of the system state as a function of time, showing the maximal solution of the hybrid system leads to convergence of $e_i-e_k$ and error $\varepsilon_a$ (the estimate of the drift $a_i$) to zero and stability of clock rate r in the absence of noise. FIGS. 4B-4D show the numerical solution of the hybrid system showing synchronization of clock rates in the presence of noise, wherein FIG. 4B shows the trajectories of the errors ei–ek for the components i∈{1, 2, 3, 4, 5} of a solution φ for the case where the system is subjected to communication noise, FIG. 4C shows noise on the internal clock output, and FIG. 4D shows noise on the clock rate reference. See section 4h for further information. FIGS. 4E and 4F compare the merits of our algorithm to competing algorithms in the literature. See section 4i for further information.

3. Example Applications

Figure 5:
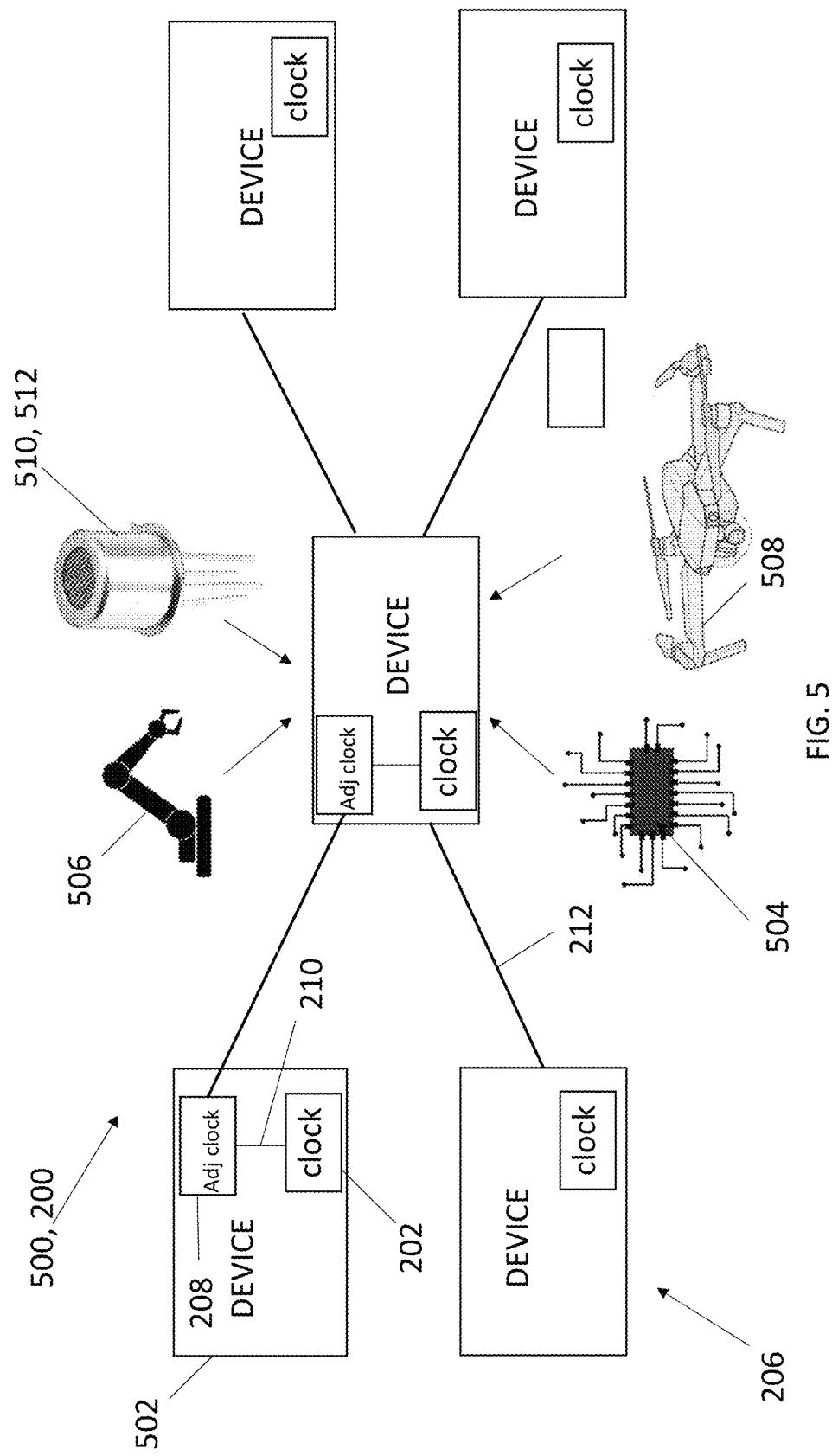
FIG. 5 Schematic illustration of a network of devices including a network of clocks.

FIG. 5 illustrates a system 500 comprising a network 200 of devices 502 (e.g., comprising a machine or agent), wherein each of the devices 502 comprises a clock 202 implemented in hardware (e.g., a hardware oscillator or circuit comprising an oscillator). The device 502 may comprise a computer or processor 504 controlling the device and the processor or computer may comprise the clock 202 controlling the processing functions of the processor or computer. Examples of device include, but are not limited to, a robot 506, a vehicle 508, a sensor 510, a computer 504, an actuator, an intelligent agent, a communications device (e.g., cell phone, cell tower), a device using distributed optimization, a smart device (e.g., heater or cooler) or component 512 in one or more smart buildings, or any smart machine or integrated circuit useful in manufacturing, a control system, or internet of things (IOT) environment. The devices are linked by a wireless or wired communications systems or links 210 so that the devices 502 operate together as part of a coordinated and automated system where synchronization of the clocks 202 in each of the devices is desirable for proper cooperative and automated operation of the devices in the system. Example systems 500 and applications include, but are not limited to, an automated manufacturing system, a robotics system (e.g., a robot swarm), an environmental control system, a cellular communications network, networking (e.g., a network of computers performing parallel processing), aerospace systems, power systems, automotive systems, and banking systems. In one or more examples, the devices are heterogeneously distributed devices and the system comprises a heterogeneously distributed system.

3. Example Hardware Environment

Figure 6:
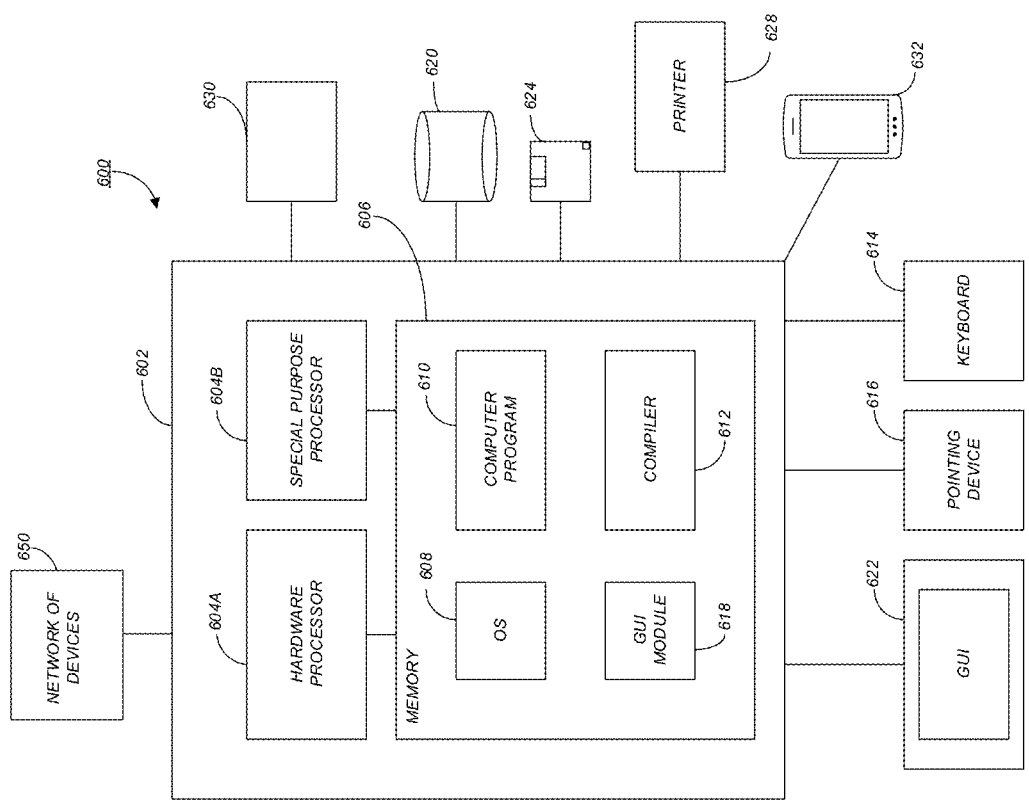
FIG. 6. Example hardware environment for performing the methods described herein.

FIG. 6 is an exemplary hardware and software environment 600 used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

In one or more examples, the computer comprises a Field Programmable Gate Array (FPGA) or Application Specific Integrated Circuit (ASIC).

FIG. 6 further illustrates the network of devices 650 including clocks coupled to the computer.

Of course, those skilled in the art will recognize that any combination of the above components, or any number of different components, peripherals, and other devices, may be used with the computer 602.

Figure 7:
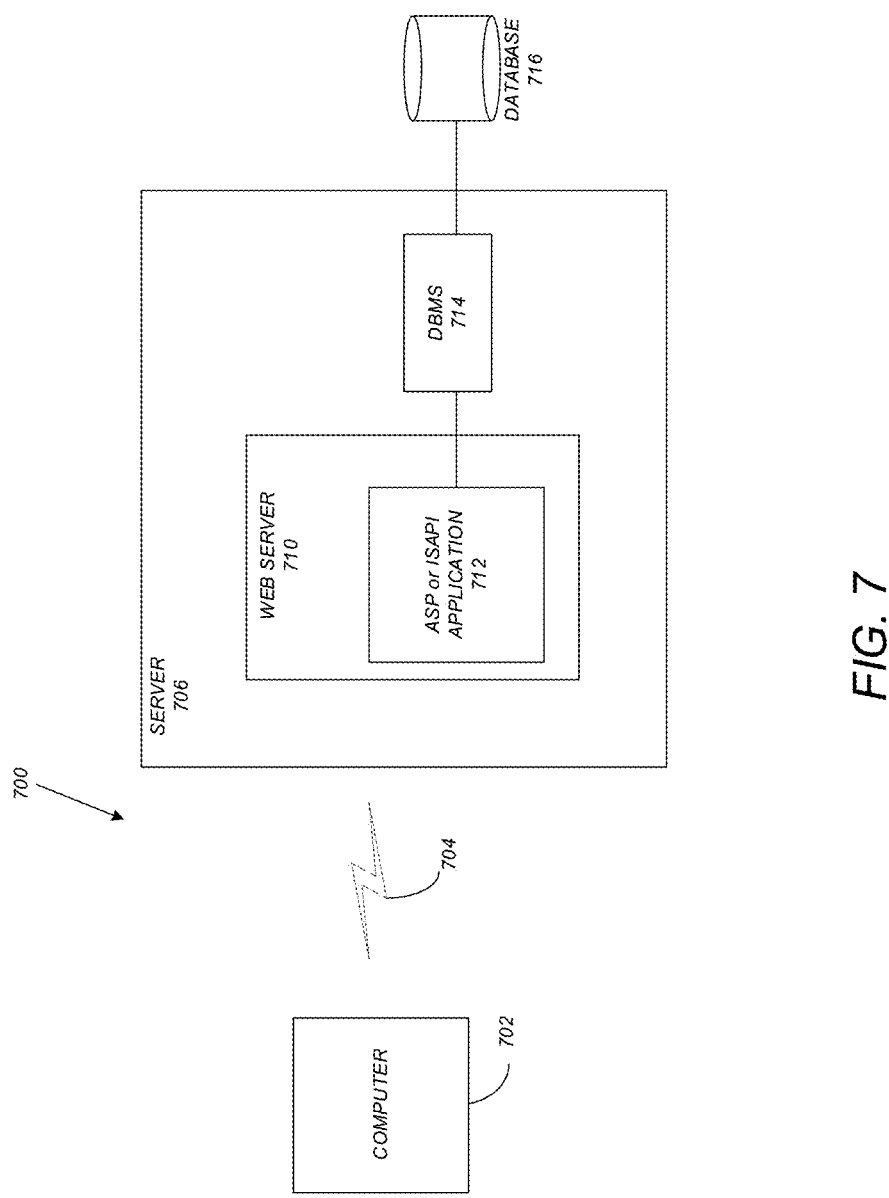
FIG. 7. Example computer network for executing the computing methods described herein.

FIG. 7 schematically illustrates a typical distributed/cloud-based computer system 700 using a network 704 to connect client computers 702 to server computers 706.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding DataBase), or ODBC (Open DataBase Connectivity).

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 702 and 706.

Software Embodiment Overview

Embodiments of the invention are implemented as a software application on a client 702 or server computer 706. Further, as described above, the client 702 or server computer 706 may comprise a thin client device or a portable device.

In one or more examples, the system comprises one or more computers (e.g., including one or more controllers):
  (a) receiving the information from each of the clocks at the one or more communication event times; and
  (b) applying the corrective action, determined from the estimate, to the one or more clocks.

In one example, one of the computers (e.g., a controller) is located at each of the nodes so as to receiving the information, determine the corrective action, and apply the corrective action to the clock at the node at which the computer is located.

4. Further Information on Example Algorithms for Implementing Distributed Feedback a. Notation The set of natural numbers including zero i.e., {0, 1, 2, . . . } is denoted by $\mathbb{N}$. The set of natural numbers is denoted as $\mathbb{N}_{>0}$, i.e., $\mathbb{N}_{>0}==\{1, 2, \ldots\}$. The set of real numbers is denoted as $\mathbb{R}$. The set of nonnegative real numbers is denoted by $\mathbb{R}_{\geq 0}$, i.e., $\mathbb{R}_{\geq 0}=[0, \infty)$. The n-dimensional Euclidean space is denoted $\mathbb{R}^n$. Given sets A and B, $F: A \rightrightarrows B$ denotes a set-valued map from A to B. For a matrix $A \in \mathbb{R}^{n \times m}$, $A^\tau$ denotes the transpose of A. Given a vector $x \in \mathbb{R}^n$, $|x|$ denotes the Euclidean norm. Given a vector $x \in \mathbb{R}^n$ and a nonempty set $\Sigma \subset \mathbb{R}^n$, $|x|_\Sigma$ denotes the Euclidean point-to-set distance, i.e., $|x|_\Sigma := \inf_{y \in \Sigma}|x-y|$. Given two vectors $x \in \mathbb{R}^n$ and $y \in \mathbb{R}^m$, we use the equivalent notation $(x,y)=[x^\tau y^\tau]^\tau$. Given a matrix $A \in \mathbb{R}^{n \times m}$, $|A|:=\max\{\sqrt{|\lambda|}: \lambda \in \text{eig}(A^\tau A)\}$. For two symmetric matrices $A \in \mathbb{R}^{m \times m}$ and $B \in \mathbb{R}^{m \times m}$, $A>B$ means that $A-B$ is positive definite; conversely, $A<B$ means that $A-B$ is negative definite. A vector of N ones is denoted $\mathbf{1}_N$. The matrix $I_n$ is used to denote the identity matrix of size n×n.

a. Graph Theory

Let $\mathcal{G}=(V,E,A)$ be a weighted directed graph (digraph) where $V=\{1, 2, \ldots, n\}$ represents the set of n nodes, $E \subset V \times V$ the set of edges, and $A \in \{0,1\}^{n \times n}$ represents the adjacency matrix. An edge of $\mathcal{G}$ is denoted by $e_{ij}=(i,j)$. The elements of A are denoted by $a_{ij}$, where $a_{ij}=1$ if $e_{ij} \in E$ and $a_{ij}=0$ otherwise. The in-degree and outdegree of a node i are defined by $d^{in}(i)=\Sigma_{k=1}^n a_{ki}$ and $d^{out}(i)=Z=\Sigma_{k=1}^n a_{ik}$, respectively. The largest and smallest in-degree of a digraph are given by $\overline{d}=\max_{i \in V}d^{in}(i)$ and $\underline{d}=\min_{i \in V}d^{in}(i)$, respectively. The in-degree matrix is an n×n diagonal matrix, denoted $\mathcal{D}$, with elements given by $$d_{ij} = \begin{cases} d^{in}(i) & \text{if } i = j \\ 0 & \text{if } i \neq j \end{cases} \forall i \in V$$

The Laplacian matrix of a digraph $\mathcal{G}$, denoted by $\mathcal{L}$, is defined as $\mathcal{L} = \mathcal{D} - A$ and has the property that $\mathcal{L}\mathbf{1}_n=0$. The set of nodes corresponding to the neighbors that share an edge with node i is denoted by $\mathcal{N}(i):=\{k \in V: e_{ki} \in E\}$. In the context of networks, $\mathcal{N}(i)$ represents the set of nodes for which an agent i can communicate with.

Lemma b1: ((Olfati-Saber and Murray, 2004, Theorem 6), (Fax and Murray, 2004, Propositions 1, 3, and 4)) For an undirected graph, $\mathcal{L}$ is symmetric and positive semidefinite, and each eigenvalue of $\mathcal{L}$ is real. For a directed graph, zero is a simple eigenvalue of $\mathcal{L}$ if the directed graph is strongly connected.

Lemma b2: (Godsil and Royle (2001)) Consider an n×n symmetric matrix $A=\{a_{ik}\}$ satisfying $\Sigma_{i=1}^n a_{ik}=0$ for each $k \in V$. The following statements hold:

There exists an orthogonal matrix U such that $$U^T A U = \begin{bmatrix} 0 & 0 \\ 0 & * \end{bmatrix},$$

where ★ represents any nonsingular matrix with appropriate dimensions and 0 represents any zero matrix with appropriate dimensions.

The matrix A has a zero eigenvalue with eigenvector $\mathbf{1}_n \in \mathbb{R}^n$ Definition b3: A weighted digraph is said to be
balanced if the in-degree matrix and the out-degree matrix for every node are equal, i.e., $d^{in}(i)=d^{out}(i)$ for each $i \in V$.

complete if every pair of distinct nodes are connected by a unique edge, i.e., $a_{ik}=1$ for each i, $k \in V$, $i \neq k$.

strongly connected if and only if for any two distinct nodes there exists a path of directed edges that connects them.

b. Hybrid Systems

A hybrid system $\mathcal{H}$ in $\mathbb{R}^n$ is composed by the following data: a set $C \subset \mathbb{R}^n$, called the flow set; a differential equation defined by the function $f: \mathbb{R}^n \to \mathbb{R}^n$ with $C \subset \text{dom } f$, called the flow map; a set $D \subset \mathbb{R}^n$, called the jump set; and a set valued mapping $G: \mathbb{R}^n \rightrightarrows \mathbb{R}^n$ with $D \subset \text{dom } G$, called the jump map. Then, a hybrid system $\mathcal{H}:=(C,f,D,G)$ is written in the compact form $$\mathcal{H}: \begin{cases} x \in C & \dot{x} = f(x) \\ x \in D & x^+ \in G(x) \end{cases} \quad (3)$$

where x is the system state. Solutions to hybrid systems are denoted by $\phi$ and are parameterized by $(t,j)$, where $t \in \mathbb{R}_{\geq 0}$ defines ordinary time and $j \in \mathbb{N}$ is a counter that defines the number of jumps. A solution $\phi$ is defined by a hybrid arc on its domain dom $\phi$ with hybrid time domain structure [19]. The domain dom $\phi$ is a hybrid time domain if dom $\phi \subset \mathbb{R}_{\geq 0} \times \mathbb{N}$ and for each $(T,J) \in \text{dom } \phi$, dom $\phi \cap ([0,T] \times \{0, 1, \ldots, J\})$ is of the form $U_{j=0}^J([t_j, t_{j+1}] \times \{j\})$, with $0=t_0 \leq t_1 \leq t_2 \leq t_{J+1}$. A function $\phi$: dom $\phi \to \mathbb{R}^n$ is a hybrid arc if dom $\phi$ is a hybrid time domain and if for each $j \in \mathbb{N}$, the function $t \mapsto \phi(t,j)$ is locally absolutely continuous on the interval $I^j=\{t:(t,j) \in \text{dom } \phi\}$. A solution $\phi$ satisfies the system dynamics; see [19, Definition 2.6] for more details. A solution $\phi$ is said to be maximal if it cannot be extended by flow or a jump, and complete if its domain is unbounded. The set of all maximal solutions to a hybrid system $\mathcal{H}$ is denoted by $\mathcal{S}_\mathcal{H}$ and the set of all maximal solutions to $\mathcal{H}$ with initial condition belonging to a set A is denoted by $\mathcal{S}_\mathcal{H}(A)$. A hybrid system is well-posed if it satisfies the hybrid basic conditions in [19, Assumption 6.5].

Definition c1: Given a hybrid system $\mathcal{H}$ defined on $\mathbb{R}^n$, the closed set $\mathcal{A} \subset \mathbb{R}^n$ is said to be globally exponentially stable (GES) for $\mathcal{H}$ if there exist $\kappa, \alpha > 0$ such that every maximal solution $\phi$ to $\mathcal{H}$ is complete and satisfies $|\phi(t,j)|_\mathcal{A} \leq \kappa e^{-\alpha(t+j)}|\phi(0,0)|_\mathcal{A}$ for each $(t,j) \in \text{dom } \phi$.

c. Example Problem Statement

Consider a group of n sensor nodes connected over a network represented by a digraph $\mathcal{G}=(V,E,A)$. Two clocks are attached to each node i of $\mathcal{G}$: an (uncontrollable) internal clock $\tau_i^* \in \mathbb{R}_{\geq 0}$ whose dynamics are given by $$\dot{\tau}_i^* = a_i \quad (4)$$

and an adjustable clock $\tilde{\tau}_i \in \mathbb{R}_{\geq 0}$ with dynamics $$\dot{\tilde{\tau}}_i = a_i + u_i \quad (5)$$

where $u_i \in \mathbb{R}$ is a control input. In both of these models, the (unknown) constant $a_i$ represents the unknown drift of the internal clock. At times $t_j$ for $j \in \mathbb{N}_{>0}$ (we assume $t_0=0$), node i receives measurements $\tilde{t}_k$ from its neighbors, namely, for each $k \in \mathcal{N}(i)$. The resulting sequence of time instants $\{t_j\}_{j=1}^\infty$ is assumed to be strictly increasing and unbounded.

Moreover, for such a sequence, the time elapsed between each time instant when the clock measurements are exchanged satisfies $\mathbb{N}$ $$T_1 \leq t_{j+1} - t_j \leq T_2, 0 \leq t_1 \leq T_2 \forall j \in \mathbb{N}_{>0} \qquad (6)$$

where $0 < T_1 \leq T_2$, with $T_1$ defining a minimum time between consecutive measurements and $T_2$ defines the maximum allowable transfer interval (MATI).

Remark d1: In this example, the models for the clocks are based on the hardware and software relationship of the real-time system that implements them. That is, the internal clock $\tau_i^*$ is treated as a type of hardware oscillator while the adjustable clock $\tilde{\tau}_i$ is treated as a virtual clock, implemented in software (as part of the algorithm), that evolves according to the dynamics of the hardware oscillator. Any virtual clock implemented in node i inherits the drift parameter $a_i$ of the internal clock, which cannot be controlled. More importantly, this drift parameter is not known due to the fact that universal time information is not available to any node. The input $u_i$ is unconstrained as allowed by hardware platforms.

Under such a setup, a goal of the present invention is to design a distributed hybrid controller that, without knowledge of the drift parameter and of the communication times in advance, assigns the input $u_i$ to drive each clock $\tilde{\tau}_i$ to synchronization with every other clock $\tilde{\tau}_k$, with $\tilde{\tau}_k$ evolving at a common prespecified constant rate of change $\sigma^* > 0$ for each $k \in V$. This problem is formally stated as follows:

Problem 1: Given a network of n agents with dynamics as in (4) and (5) represented by a directed graph $\mathcal{G}$ and $\sigma^* > 0$, design a distributed hybrid controller that achieves the following two properties when information between agents is exchanged at times $t_j$ satisfying [6]:

i) Global clock synchronization: for each initial condition, the components $\tilde{\tau}_1, \tilde{\tau}_2, \ldots, \tilde{\tau}_n$ of each complete solution to the system satisfy $$\lim_{t \to \infty} |\tilde{\tau}_i(t) - \tilde{\tau}_k(t)| = 0 \forall i, k \in V, i \neq k$$

ii) Common clock rate: for each initial condition, the components $\tilde{\tau}_1, \tilde{\tau}_2, \ldots, \tilde{\tau}_n$ of each complete solution to the system satisfy $$\lim_{t \to \infty} |\dot{\tilde{\tau}}_i(t) - \sigma^*| = 0 \forall i \in V$$

d. Example Solution: Distributed Hybrid Controller for Time Synchronization We define the hybrid model that provides the framework and a solution to Problem 1 First, since we are interested in the ability of the rate of each clock to synchronize to a constant rate $\sigma^*$, we use the following change of coordinates: for each $i \in V$, define $e_i := \tilde{\tau}_i - r$, where $r \in \mathbb{R}_{\geq 0}$ is an auxiliary variable such that $\dot{r} = \sigma^*$. The state r is only used for analysis. Then, the dynamics for $e_i$ are given by $$\dot{e}_i = \dot{\tilde{\tau}}_i - \sigma^* \forall i \in V \qquad (7)$$

By making the appropriate substitutions, one has $$\dot{e}_i = a_i + u_i - \sigma^* \forall i \in V \qquad (8)$$

To model the network dynamics for aperiodic communication events at $t_j$'s satisfying 6, we consider a timer variable $\tau$ with hybrid dynamics $$\dot{\tau} = -1 \tau \in [0, T_2], \tau^+ \in [T_1, T_2] \tau = 0 \qquad (9)$$

This model is such that when $\tau = 0$, a communication event is triggered, and $\tau$ is reset to a point in the interval $[T_1, T_2]$ in order to preserve the bounds given in (6); see [22].

The hybrid algorithm assigns a value to $u_i$ so as to solve Problem 1 which in the $e_i$ coordinates requires $e_i$ to converge to zero for each $i \in V$. In fact, the algorithm implements two feedback laws: a distributed feedback law and a local feedback law. The distributed feedback law utilizes a control variable $\eta_i \in \mathbb{R}$ that is impulsively updated at communication event times using both local and exchanged measurement information $\tilde{\tau}_k$. Specifically, it takes the form $$\eta_i^+ = \sum_{k \in N(i)} K_i^k(\tilde{\tau}_i, \tilde{\tau}_k)$$

where $K_i^k(\tilde{\tau}_i, \tilde{\tau}_k) := -\gamma_i(e_i - e_k)$ with $\gamma_i > 0$. Between communication event times, $\eta_i$ evolves continuously. The local feedback strategy utilizes a continuous-time linear adaptive estimator with states $\hat{\tau}_i \in \mathbb{R}$ and $\hat{a}_i \in \mathbb{R}$ to estimate the drift $a_i$ of the internal clock. The estimate of the drift is then injected as feedback to compensate for the effect of $a_i$ on the evolution of $\tilde{\tau}_i$. Furthermore, the local feedback strategy injects $\sigma^*$ to attain the desired clock rate for $\tilde{\tau}_i$.

The dynamics of the i-th hybrid controller are given by $$\left.\begin{array}{l} \dot{u}_i = h_i \eta_i - \mu_i(\hat{\tau}_i - \tau_i^*), \dot{\eta}_i = h_i \eta_i \\ \dot{\hat{a}}_i = -\mu_i(\hat{\tau}_i - \tau_i^*), \dot{\hat{\tau}}_i = \hat{a}_i - (\hat{\tau}_i - \tau_i^*) \\ u_i^+ = -\gamma_i \sum_{k \in N(i)} (\tilde{\tau}_i - \tilde{\tau}_k) - \hat{a}_i + \sigma^*, \hat{a}_i^+ = \hat{a}_i \\ \eta_i^+ = -\gamma_i \sum_{k \in N(i)} (\tilde{\tau}_i - \tilde{\tau}_k), \hat{\tau}_i^+ = \hat{\tau}_i \end{array}\right\} \qquad (10)$$

where $h_i \in \mathbb{R}$, $\gamma_i > 0$ are controller parameters for the distributed hybrid consensus controller and $\mu_i > 0$ is a parameter for the local parameter estimator. The state $\eta$ is included in the model to facilitate a model reduction used in the results that follow. Note that $u_i$ is treated (with some abuse of notation) as an auxiliary state of the controller. This state is kept constant in between events and is reset to the new value of $\eta_i - \hat{a}_i + \sigma^*$ at jumps. Observe that the distributed controller only uses local and communicated information from the neighboring nodes at communication event times $t_j$, which, as explained above 4}, are times at which $\tau$ is zero.

With the timer variable and hybrid controller defined in (10), we construct the hybrid closed-loop system $\mathcal{H}$ obtained from the interconnection between the distributed hybrid controller and the local adaptive estimator given in error coordinates. The state of the closed-loop system is $$x = (e, u, \eta, \tau^*, \hat{a}, \hat{\tau}, \tau) \in X \qquad (11)$$

where $X := \mathbb{R}^n \times \mathbb{R}^n \times \mathbb{R}^n \times \mathbb{R}_{\geq 0}^n \times \mathbb{R}^n \times \mathbb{R}_{\geq 0}^n \times [0, T_2]$ with $(\eta_1, \eta_2, \ldots, \eta_n)$, $\tau^* = (\tau_1^*, \tau_2^*, \ldots, \tau_N^*)$, $\hat{\tau} = (\hat{\tau}_1, \hat{\tau}_2, \ldots, \hat{\tau}_N)$ $a = (a_1, a_2, \ldots, a_N)$, and $\hat{a} = (\hat{a}_1, \hat{a}_2, \ldots, \hat{a}_n)$. Then, let $$\mathcal{H} = (C, f, D, G) \qquad (12)$$

where the dynamics and data $(C, f, D, G)$ are given by $(\dot{e}, \dot{u}, \dot{\eta}, \dot{\tau}^*, \dot{\hat{a}}, \dot{\hat{\tau}}, \dot{\tau}) = (a + u - \sigma^* \mathcal{L}_n, h\eta - \mu(\hat{\tau} - \tau^*), h\eta, a, -\mu(\hat{\tau} - \tau^*), \hat{a} - (\hat{\tau} - \tau^*), -1) =: f(x)$ for each $x \in C$ and $(e^+, u^+, \eta^+, \tau^{*+}, \hat{a}^+, \hat{\tau}^+, \tau^+) = (e, -\gamma 1 e - \hat{a} + \sigma^* \mathcal{L}_n, -\gamma \mathcal{L} e, \tau^*, \hat{a}, \hat{\tau}, [T_1, T_2]) =: G(x)$ for each $x \in D$ where $C := X$ and $D := \{x \in X : \tau = 0\}$. Note that $X \subset \mathbb{R}^m$ where m=7n With the hybrid system $\mathcal{H}$ defined, the next two results establish existence of solutions to $\mathcal{H}$ and that every maximal solution to $\mathcal{H}$ is complete. In particular, we show that, through the satisfaction of some basic conditions on the hybrid system data, which is shown first, the system $\mathcal{H}$ is well-posed and that each maximal solution to the system is defined for arbitrarily large t+j.

Lemma e1: The hybrid system $\mathcal{H}$ satisfies the hybrid basic conditions defined in [19, Assumption 6.5].

Lemma e2: For every $\xi \in C \cup D(=X)$, every maximal solution $\phi$ to $\mathcal{H}$ with $\phi(0,0)=\xi$ is complete.

The properties given in these two lemmas are easily established from the information given in the data of $\mathcal{H}$; see [20] for full details on the proofs of these results.

With the hybrid closed-loop system $\mathcal{H}$ in (12), the set to asymptotically stabilize so as to solve Problem 1 is $$\mathcal{A} := \{x \in X : e_i = e_k, \eta_i = 0, \hat{a}_i = a_i, \hat{\tau}_i^* = \tau_i^* u_i = \eta_i - \hat{a}_i + \sigma^* \forall i, k \in \mathcal{V}\} \tag{13}$$

Note that $e_i = e_k$ and $\eta_i = 0$ for all i, $k \in \mathcal{V}$ imply synchronization of the clocks, meanwhile $\hat{a}_i = a_i$ and $\tau_i^* = \hat{\tau}_i$ for all i, $k \in \mathcal{V}$ ensure no error in the estimation of the clock skew and that the internal and estimated clocks are synchronized, respectively. The inclusion of $u_i = -\hat{a}_i + \sigma^*$ in $\mathcal{A}$ ensures that, for each $i \in \mathcal{V}$, $e_i$ remains constant (at zero) so that $e_i$ does not leave the set $\mathcal{A}$. This property is captured in the following result using the notion of forward invariance of a set.

Remark e3: Given that each maximal solution $\phi$ to $\mathcal{H}$ is complete, with the state variable $\tau$ acting as a timer for $\mathcal{H}$, for every initial condition $\phi(0,0) \in C \cup D$ we can characterize the domain of each solution $\phi$ to $\mathcal{H}$ as follows:

$$dom \phi = \bigcup_{j \in \mathbb{N}} [t_j, t_{j+1}] \times \{j\} \tag{14}$$

with $t_0 = 0$ and $t_{j+1} - t_j$ as in (6). Furthermore, the structure of the above hybrid time domain implies that for each $(t,j) \in dom \phi$ we have $$t \leq T_2(j+1) \tag{15}$$

Lemma e4: Given a strongly connected digraph $\mathcal{G}$, the set $\mathcal{A}$ in (13) is forward invariant for the hybrid system $\mathcal{H}$, i.e., each maximal solution $\phi$ to $\mathcal{H}$ with $\phi(0,0) \in \mathcal{A}$ is complete and satisfies $\phi(t,j) \in \mathcal{A}$ for each $(t,j) \in dom \phi$ (see [23, Chapter 10]).

With the definitions of the closed-loop system in $\mathcal{H}$ and the set of interest $\mathcal{A}$ in (13) to asymptotically stabilize in order to solve Problem 1 we introduce our main result showing global exponential stability of $\mathcal{A}$ to $\mathcal{H}$. This result is established through an analysis of an auxiliary system $\mathcal{H}_\varepsilon$ presented in (25) and its global exponential stability for the auxiliary set $\overline{\mathcal{A}_\varepsilon}$ in (27), the details of which can be found in Section 5E.

Theorem 1: Given a strongly connected digraph $\mathcal{G}$, if the parameters $T_2 \geq T_1 > 0$, $\mu > 0$, $h \in \mathbb{R}$, and $\gamma > 0$, the positive definite matrices $P_1$, $P_2$, and $P_3$ are such that $$P_2 A_{f_3} + A_{f_3}^T P_2 < 0, \; P_3 A_{f_4} + A_{f_4}^T P_3 < 0 \tag{16}$$

$$A_{g_2}^T \exp(A_{f_2}^T v) P_1 \exp(A_{f_2} v) A_{g_2} - P_1 < 0 \forall v \in [T_1, T_2] \tag{17}$$

$$\left| \exp\left(\frac{\overline{\kappa}_1}{\alpha_2} T_2\right) \left(1 - \frac{\overline{\kappa}_2}{\alpha_2}\right) \right| < 1 \tag{18}$$

hold, where $A_{f_2}$, $A_{g_2}$ are given in (26) and $$\overline{\kappa}_1 = m\left\{\frac{\kappa_1}{2\epsilon}, \frac{\kappa_1 \epsilon}{2} - \beta_2\right\}, \; \overline{\kappa}_2 = m\{1, \kappa_2\} \tag{19}$$

$$\kappa_1 = 2 \max_{v \in [0, T_2]} \left| \exp(A_{f_2}^T v) P_1 \exp(A_{f_2} v) \right|$$

$$\kappa_2 \in \left(0, -\min_{v \in [T_1, T_2]} \{\lambda_{\min}(A_{g_2}^T \exp(A_{f_2}^T v) P_1 \exp(A_{f_2} v) A_{g_2} - P_1)\}\right)$$

$$\alpha_2 = \max_{v \in [0, T_2]} \{\exp(2hv), \lambda_{\max}(\exp(A_{f_2}^T v) P_1 \exp(A_{f_2} v))$$

$$\lambda_{\max}(P_2), \lambda_{\max}(P_3)\} \tag{19}$$

with $\epsilon > 0$, and $\beta_1 > 0$ and $\beta_2 > 0$ such that, in light of (16), $P_2 A_{f_3} + A_{f_3}^T P_2 \leq \beta_1 I_2$ and $P_3 A_{f_4} + A_{f_4}^T P_3 \leq -\beta_2 I_{2(n-1)}$ then, the set $\mathcal{A}$ in 13j is globally exponentially stable for the hybrid system $\mathcal{H}$ in (12).

To validate our theoretical stability result in Theorem 1 consider five agents with dynamics as in (4) and (5) over a strongly connected digraph with the following adjacency matrix= $\mathcal{G}_A$=([0,1,1,0,1], [1,0,1,0,0], [1,0,0,1,0], [0,0,1,0,1], [1,0,1,1,0]). Given $T_1$=0.01,$T_2$=0.1, and $\sigma^*$=1, then it can be found that the parameters h=−1.3,μ=3,γ=0.125, suitable matrices $P_1$, $P_2$, $P_3$ (see [20] for details), and $\epsilon$=1.607 satisfy conditions 17 and 18) in Theorem 1 with $\overline{\kappa}_1$=9.78, $\kappa_1$=31.44, $\overline{\kappa}_2$=1, and $\alpha_2$=18.923. FIG. 4A shows the trajectories of $e_i - e_k$, $\varepsilon_{a_i}$ for components $i \in \{1,2,3,4,5\}$ of a solution $\phi$ for the case where $\sigma=\sigma^*$ with initial conditions $\phi_e(0,0)=(1,-1, 2,-2,0), \phi_{\eta_1}(0,0)=(0,-3,1,-4,-1)$, and clock rates $a_i$ in the range (0.85,1.15).

e. Example Key Properties of the Nominal Closed-Loop System (i) Reduced Model-First Pass In this section, we recast the hybrid system $\mathcal{H}$ into a reduced model obtained by setting $u = \eta - \hat{a} + \sigma^* \mathbf{1}_n$. This reduced model enables assessing asymptotic stability of $\mathcal{A}$. It is given in error coordinates for the parameter estimation of the internal clock rate and also the error of the internal clock state. We let $\varepsilon_a = a - \hat{a}$ denote the estimation error of the internal clock rate and $\varepsilon_\tau = \hat{\tau} - \tau^*$ represent the estimation error of the internal clock state. The state of the reduced model is given by $x_\varepsilon := (e, \eta, \varepsilon_a, \varepsilon_\tau, \tau) \in \mathbb{R}^n \times \mathbb{R}^n \times \mathbb{R}^n \times \mathbb{R}^n \times [0, T_2] =: X_\varepsilon$ with dynamics defined by the data $$f_\varepsilon(x_\varepsilon) := (\eta + \varepsilon_a, h\eta, \mu \varepsilon_\tau, -\varepsilon_\tau - \varepsilon_a, -1) \; \forall x_\varepsilon \in C_\varepsilon$$

$$G_\varepsilon(x_\varepsilon) := (e, -\gamma \mathcal{L} e, \varepsilon_a, \varepsilon_\tau, [T_1, T_2]) \; \forall x_\varepsilon \in D_\varepsilon \tag{20}$$

where $C_\varepsilon := X_\varepsilon$ and $D_\varepsilon := \{x_\varepsilon \in X_\varepsilon : \tau = 0\}$. This system is denoted $\mathcal{H}_\varepsilon = (C_\varepsilon, f_\varepsilon, D_\varepsilon, G_\varepsilon)$. Note that the construction $u = \eta - \hat{a} + \sigma^* \mathbf{1}_n$, which holds along all solutions after the first jump, leads to $\dot{e} = \eta + \varepsilon_a$.

To relate the properties of the reduced model to those of the hybrid system $\mathcal{H}$, we establish a result showing an equivalence between the solutions of $\mathcal{H}$ in 12 and $\mathcal{H}_\varepsilon$ defined above. The result shows that after the first jump, each solution $\phi$ to $\mathcal{H}$ is equivalent to a solution $\phi^\varepsilon$ to $\mathcal{H}_\varepsilon$, when the trajectories of the timer variable $\tau$ for both solutions are equal. To facilitate such a result, we define the function $M: X \to X_\varepsilon$ given by $$M(x) := (e, \eta, a - \hat{a}, \hat{\tau} - \tau^*, \tau) \tag{21}$$

where $x \equiv (e, u, \eta, \tau^*, \hat{a}, \hat{\tau}, \tau)$, as defined in (11), and the function $\tilde{M}: X_\varepsilon \times \mathbb{R}_{\geq 0}^n \times \mathbb{R}_{\geq 0}^n \to X$ given by $$\bar{M}(x_\varepsilon, \hat{\tau}, \tau^*) := \begin{bmatrix} e \\ \eta & -(a-\varepsilon_a) + \sigma^* 1_n \\ \eta \\ \hat{\tau} - \varepsilon_\tau \\ a - \varepsilon_a \\ \varepsilon_\tau + \tau^* \\ \tau \end{bmatrix} \quad (22)$$

Lemma f1: Let $T_2 \geq T_1 > 0$, digraph $\mathcal{G}$, and hybrid systems $\mathcal{H}$ and $\mathcal{H}_\varepsilon$ be given as in (12) and (20), respectively. For each $\phi \in \mathcal{S}_\mathcal{H}$ and each such that $\phi(0,0) = \bar{M}(\phi(0,0), \phi_{\hat\tau}(0,0), \phi_{\tau^*}(0,0))$ and timer components $\phi_\tau(t,j) = \phi_\tau^\varepsilon(t,j)$ for all $(t,j) \in \text{dom } \phi$, it follows that $\text{dom } \phi = \text{dom } \phi^\varepsilon$ and $\phi(t,j) = \bar{M}(\phi^\varepsilon(t,j), \phi_{\hat\tau}(t,j), \phi_{\tau^*}(t,j))$ for each $(t,j) \in \text{dom } \phi$.

With the reduced model $\mathcal{H}_\varepsilon$ in place, we consider the following set to asymptotically stabilize for $\mathcal{H}_\varepsilon$:

$$\mathcal{A}_\varepsilon := \{x_\varepsilon \in X_\varepsilon : e_i = e_k, \eta_i = 0 \forall i, k \in V, \varepsilon_a = 0, \varepsilon_\tau = 0\} \quad (23)$$

This set is equivalent to $\mathcal{A}$ in the sense that the point-to-set distance metrics $|x|_\mathcal{A}$ and $|x|_{\mathcal{A}_\varepsilon}$ are equivalent when the map M is applied, as demonstrated in the results that follow.

Lemma f2: Given $T_2 \geq T_1 > 0$ and a strongly connected digraph $\mathcal{G}$, the set $\mathcal{A}$ in (13) is GES for the hybrid system $\mathcal{H}$ if $\mathcal{A}_\varepsilon$ is GES for the hybrid system $\mathcal{H}_\varepsilon$. See [20] and the priority application U.S. Ser. No. 63/045,603 for proofs of the lemmas e1-e2.

(ii) Reduced Model—Second Pass

Global exponential stability of $\mathcal{A}_\varepsilon$ for $\mathcal{H}_\varepsilon$ is established by performing a Lyapunov analysis on a version of $\mathcal{H}_\varepsilon$ obtained after an appropriate change of coordinates, one where the flow and jump dynamics are linearized. The model is obtained by exploiting an important property of the eigenvalues of the Laplacian matrix for strongly connected digraphs.

To this end, let $\mathcal{G}$ be a strongly connected digraph. By Lemma 2.1 and Lemma 2.2, one has that zero is a simple eigenvalue of the Laplacian matrix $\mathcal{L}$ with an associated eigenvector $$v_1 = \frac{1}{\sqrt{N}} 1_N.$$

Furthermore, there exists a nonsingular matrix $$\mathcal{T} = [v_1, \mathcal{T}_1] \quad (24)$$

where $\mathcal{T}_1 \in \mathbb{R}^{N \times N-1}$ is a matrix whose columns are the remaining eigenvectors of $\mathcal{L}$, i.e., $[v_2, \ldots, v_N]$, such that $$\mathcal{T}^{-1} \mathcal{L} \mathcal{T} = \begin{bmatrix} 0 & 0 \\ 0 & \bar{\mathcal{L}} \end{bmatrix},$$

where $\mathcal{L}$ is the graph Laplacian of $\mathcal{G}$ and $\bar{\mathcal{L}}$ is a diagonal matrix with the nonnegative eigenvalues of $\mathcal{L}$ as the diagonal elements given by $(\lambda_2, \lambda_3, \ldots, \lambda_N)$, see [9], [10], and [24] for more details.

To perform the said change of coordinates, we use $\mathcal{T}$ to first perform the following transformations: $\bar{e} = \mathcal{T}^{-1} e \bar{\eta} = \mathcal{T}^{-1} \eta, \bar{\varepsilon}_a = \mathcal{T}^{-1} \varepsilon_a$ and $\bar{\varepsilon}_\tau = \mathcal{T}^{-1} \varepsilon_\tau$. Then, we define vectors $\bar{z} = (\bar{z}_1, \bar{z}_2)$ and $\bar{w} = (\bar{w}_1, \bar{w}_2)$, where $\bar{z}_1 := (\bar{e}_1, \bar{\eta}_1), \bar{z}_2 := (\bar{e}_2, \ldots, \bar{e}_N, \bar{\eta}_2, \ldots, \bar{\eta}_N), \bar{w}_1 := (\bar{\varepsilon}_{a_1}, \bar{\varepsilon}_{\tau_1})$, and $\bar{w}_2 := (\bar{\varepsilon}_{a_2}, \ldots, \bar{\varepsilon}_{a_n}, \bar{\varepsilon}_{\tau_2}, \ldots, \bar{\varepsilon}_{\tau_n})$. Finally, we define $\chi_\varepsilon := (\bar{z}_1, \bar{z}_2, \bar{w}_1, \bar{w}_2, \tau) \in \mathbb{R}^2 \times \mathbb{R}^{2(n-1)} \times \mathbb{R}^2 \times \mathbb{R}^{2(n-1)} \times [0, T_2] = X_\varepsilon$ as the state of the new version of $\mathcal{H}_\varepsilon$, which is denoted $\tilde{\mathcal{H}}_\varepsilon$ and has data given by $$\tilde{f}_\varepsilon(\chi_\varepsilon) := \begin{bmatrix} A_{f_1} \bar{z}_1 \\ A_{f_2} \bar{z}_2 \\ A_{f_3} \bar{w}_1 \\ A_{f_4} \bar{w}_2 \\ -1 \end{bmatrix} + \begin{bmatrix} B_{f_1} \bar{w}_1 \\ B_{f_2} \bar{w}_2 \\ 0 \\ 0 \\ 0 \end{bmatrix}, \tilde{G}_\varepsilon(\chi_\varepsilon) := \begin{bmatrix} A_{g_1} \bar{z}_1 \\ A_{g_2} \bar{z}_2 \\ \bar{w}_1 \\ \bar{w}_2 \\ [T_1, T_2] \end{bmatrix}$$

for each $\chi_\varepsilon$ in $\tilde{C}_\varepsilon := X_\varepsilon$ and in $\tilde{D}_\varepsilon := \{\chi_\varepsilon \in X_\varepsilon : \tau = 0\}$ respectively, with $$A_{f_1} = \begin{bmatrix} 0 & 1 \\ 0 & h \end{bmatrix}, \quad A_{f_2} = \begin{bmatrix} 0 & I_m \\ 0 & hI_m \end{bmatrix}, A_{f_3} = \begin{bmatrix} 0 \\ -1 \end{bmatrix} \quad (26)$$

$$A_{f_4} = \begin{bmatrix} 0 & \mu I_m \\ -I_m & -I_m \end{bmatrix}, \quad B_{f_1} = \begin{bmatrix} 1 & 0 \\ 0 & 0 \end{bmatrix}, B_{f_2} = \begin{bmatrix} I_m \\ 0 \end{bmatrix}$$

$$A_{g_1} = \begin{bmatrix} 1 & 0 \\ 0 & 0 \end{bmatrix}, \quad A_{g_2} = \begin{bmatrix} I_m & 0 \\ -\gamma \bar{\mathcal{L}} & 0 \end{bmatrix}$$

and $m = N-1$. Then, $\tilde{\mathcal{H}}_\varepsilon = (\tilde{C}_\varepsilon, \tilde{f}_\varepsilon, \tilde{D}_\varepsilon, \tilde{G}_\varepsilon)$ denotes the new version of $\mathcal{H}$. The set $\tilde{\mathcal{A}}$ to stabilize in the new coordinates for this hybrid system is given by $$\tilde{\mathcal{A}}_\varepsilon := \{\chi_\varepsilon \in X_\varepsilon : \bar{z}_1 = (e^*, 0), \bar{z}_2 = 0, \bar{w}_1 = 0, \bar{w}_2 = 0, e^* \in \mathbb{R}\} \quad (27)$$

In the following two results, we first demonstrate the relationship between the sets $\tilde{\mathcal{A}}_\varepsilon$ for $\tilde{\mathcal{H}}_\varepsilon$ and $\mathcal{A}_\varepsilon$ for $\mathcal{H}_\varepsilon$ so as to solve Problem 1 Then, similar to Lemma e2 we show that global exponential stability of $\tilde{\mathcal{A}}_\varepsilon$ for $\tilde{\mathcal{H}}_\varepsilon$ implies global exponential stability of $\mathcal{A}_\varepsilon$ for $\mathcal{H}_\varepsilon$. See [20] and the priority application U.S. Ser. No. 63/045,603 for proofs.

Lemma f3: Let $T_2 \geq T_1 > 0$, digraph $\mathcal{G}$, and hybrid systems $\mathcal{H}_\varepsilon$ and $\tilde{\mathcal{H}}_\varepsilon$ be given as in (20) and (25), respectively. For each solutions $\phi \in \mathcal{S}_{\mathcal{H}_\varepsilon}$ there exists a solution $\tilde{\phi} \in \mathcal{S}_{\tilde{\mathcal{H}}_\varepsilon}$ such that $\phi(t,j) = \Gamma \tilde{\phi}(t,j)$ for each $(t,j) \in \text{dom } \phi$ if and only if for each solutions $\tilde{\phi} \in \mathcal{S}_{\tilde{\mathcal{H}}_\varepsilon}$ there exists a solution $\phi \in \mathcal{S}_{\mathcal{H}_\varepsilon}$ such that $\tilde{\phi}(t,j) = \Gamma^{-1} \phi(t,j)$ for each $(t,j) \in \text{dom } \tilde{\phi}$ where $\Gamma = \text{diag}(\mathcal{T}, \mathcal{T}, \mathcal{T}, \mathcal{T}, 1)$.

Lemma f4: Given $0 < T_1 \leq T_2$ and a strongly connected digraph $\mathcal{G}$, $\xi \in \mathcal{A}_\varepsilon$ if and only if $\chi_\varepsilon := \Gamma^{-1} \xi \in \tilde{\mathcal{A}}_\varepsilon$, where $\Gamma^{-1} = \text{diag}(\mathcal{T}^{-1}, \mathcal{T}^{-1}, \mathcal{T}^{-1}, \mathcal{T}^{-1}, 1)$ and $\mathcal{T}$ is given in 24. Moreover, for each $x_\varepsilon \in X_\varepsilon$ and each $X_\varepsilon \in \chi_\varepsilon$, $|\chi_\varepsilon|_{\tilde{\mathcal{A}}_\varepsilon} \leq |\Gamma^{-1}| \|x_\varepsilon|_{\mathcal{A}_\varepsilon}$ and $|x_\varepsilon|_{\mathcal{A}_\varepsilon} \leq |\Gamma| |\chi_\varepsilon|_{\tilde{\mathcal{A}}_\varepsilon}$.

Lemma f5: Given $0 < T_1 \leq T_2$ and a strongly connected digraph $\mathcal{G}$, the set $\tilde{\mathcal{A}}$ is GES for the hybrid system $\tilde{\mathcal{H}}_\varepsilon$ if and only if $\mathcal{A}_\varepsilon$ is GES for the hybrid system $\mathcal{H}_\varepsilon$.

(iii) Parameter Estimator

Exponential stability of the set $\tilde{\mathcal{A}}_\varepsilon$ for $\tilde{\mathcal{H}}_\varepsilon$ hinges upon the convergence of the estimate $\hat{a}$ to $a$. We present a result establishing convergence of $\hat{a}$ to $a$ by considering a model reduction of $\tilde{\mathcal{H}}_\varepsilon$. To this end, consider the state $\chi_{\varepsilon_r} := (\bar{w}_1, \bar{w}_2, \tau) \in \mathbb{R}^2 \times \mathbb{R}^{2(n-1)} \times [0, T_2] =: X_{\varepsilon_r}$. Its dynamics are given by the system $\tilde{\mathcal{H}}_{\varepsilon_r} = (\tilde{C}_{\varepsilon_r}, \tilde{f}_{\varepsilon_r}, \tilde{D}_{\varepsilon_r}, \tilde{G}_{\varepsilon_r})$ with data $\tilde{f}\varepsilon(\chi_{\varepsilon_r})$ for each $\chi_{\varepsilon_r} \in \tilde{C}_{\varepsilon_r}$ and $\tilde{G}_{\varepsilon_r}(\chi_{\varepsilon_r})$ for each $\chi_{\varepsilon_r} \in \tilde{D}_{\varepsilon_r}$ where $$\tilde{f}_{\varepsilon_r}(\chi_{\varepsilon_r}) = (A_{f_3} \bar{w}_1, A_{f_4} \bar{w}_2, -1)$$

$$\tilde{G}_{\varepsilon_r}(\chi_{\varepsilon_r}) := (\bar{w}_1, \bar{w}_2, [T_1, T_2])$$

where $\tilde{C}_{\varepsilon_r} := X_{\varepsilon_r}$ and $\tilde{D}_{\varepsilon_r} := \{\chi_{\varepsilon_r} \in X_{\varepsilon_r} : \tau = 0\}$. For this system, the set to exponentially stabilize is given by $$\tilde{\mathcal{A}}_{\varepsilon_r} := \{0\} \times \{0\} \times [0, T_2] \quad (29)$$

In the next result, we show global exponential stability of the set $\hat{\mathcal{A}}_{\varepsilon_r}$ for $\tilde{\mathcal{H}}_{\varepsilon_r}$ through the satisfaction of matrix inequalities. See [20] and the priority application U.S. Ser. No. 63/045,603 for proof.

Proposition f1: If there exists a positive scalar $\mu$ and positive definite symmetric matrices $P_2$, $P_3$ such that, with $A_{f_3}$ and $A_{f_4}$ as in (26), the conditions in (16) hold, then the set $\hat{\mathcal{A}}_{\varepsilon_r}$ is globally exponentially stable for the hybrid system $\mathcal{H}_{\varepsilon_r}$. Furthermore, every solution $\hat{\phi}$ to $\mathcal{H}_{\varepsilon_r}$ satisfies $$|\hat{\phi}(t,j)|_{\hat{\mathcal{A}}_{\varepsilon_r}} \leq \sqrt{\frac{\alpha_{\tilde{w}_2}}{\alpha_{\tilde{w}_1}}} \exp\left(-\frac{\bar{\gamma}\bar{\beta}}{2\alpha_{\tilde{w}_2}}(t+j)\right) |\hat{\phi}(0,0)|_{\hat{\mathcal{A}}_{\varepsilon_r}} \quad (30)$$

for each $(t,j) \in \operatorname{dom} \tilde{\phi}$, with $\alpha_{\tilde{w}_1} = \min\{\lambda_{min}(P_2), \lambda_{min}(P_3)\}$, $\alpha_{\tilde{w}_2} = \max\{\lambda_{max}(P_2), \lambda_{max}(P_3)\}$, $\bar{\beta} > 0$, and $\bar{\gamma} = \min\{1-\gamma, \gamma T_1\}$.

f. Proof of Theorem 1

Consider the following Lyapunov function candidate for $\tilde{\mathcal{H}}$ $$V(\chi_\varepsilon) := V_1(\chi_\varepsilon) + V_2(\chi_\varepsilon) + V_{\varepsilon_r}(\chi_\varepsilon) \forall \chi_\varepsilon \in X_\varepsilon \quad (31)$$

where $V_1(\chi_\varepsilon) = \exp(2h\tau)\bar{\eta}_1^2$ $$V_2(\chi_\varepsilon) = \bar{z}_2^\tau \exp(A_{f_2}^\tau \tau) P_1 \exp(A_{f_2}\tau) \bar{z}_2$$

and $V_{\varepsilon_r}(\chi_\varepsilon) = \bar{w}_1^\tau P_2 \bar{w}_1^\tau + \bar{w}_2^\tau P_3 \bar{w}_2$. Note that there exist two positive scalars $\alpha_1$, $\alpha_2$ such that $$\alpha_1 |\chi_\varepsilon|^2_{\hat{\mathcal{A}}_\varepsilon} \leq V(\chi_\varepsilon) \leq \alpha_2 |\chi_\varepsilon|^2_{\hat{\mathcal{A}}_\varepsilon} \forall \chi_\varepsilon \in \tilde{C}_\varepsilon \cup \tilde{D}_\varepsilon \quad (32)$$

With $P_1$ positive definite and noting the nonsingularity of $\exp(A_{f_2}\tau)$ for every $\tau$, we have $\alpha_1 = \min_{v \in [0,T_2]}\{\exp(2hv)\lambda_{min}(\exp(A_{f_2}^\tau v)P_1 \exp(A_{f_2}v)), \lambda_{min}(P_2), \lambda_{min}(P_3)\}$ and $\alpha_2$ as in 19. For each $\chi_\varepsilon \in \tilde{C}_\varepsilon$, one has $$\langle \nabla V(\chi_\varepsilon), \tilde{f}_\varepsilon(\chi_\varepsilon)\rangle = 2\bar{z}_2^\tau(\exp(A_{f_2}^\tau \tau)P_1 \exp(A_{f_2}\tau))B_{f_2}\bar{w}_2 + \bar{w}_1^\tau(P_2 A_{f_3} + A_{f_3}^\tau P_2)\bar{w}_1 + \bar{w}_2^\tau(P_3 A_{f_4} + A_{f_4}^\tau P_3)\bar{w}_2 \quad (33)$$

Now, by noting the conditions in 16p, with $\beta_1 > 0$ and $\beta_2 > 0$ such that $P_2 A_{f_3} + A_{f_3}^{\tau P}{}_2 \leq -\bar{\beta_1} I$, and $P_3 A_{f_4} + A_{f_4}^\tau P_3 \leq -\beta_2 I$ then one has $$\langle \nabla V(\chi_\varepsilon), \tilde{f}_\varepsilon(\chi_\varepsilon)\rangle \leq \kappa_1 |\bar{z}_2||\bar{w}_2| - \beta_1|\bar{w}_1|^2 - \beta_2|\bar{w}_2|^2$$

where $\kappa_1$ is as given in (19). Applying Young's inequality to $\kappa_1 |\bar{z}_2||\bar{w}_2|^3$ we obtain $$\langle \nabla V(\chi_\varepsilon), \tilde{f}_\varepsilon(\chi_\varepsilon)\rangle \leq \frac{\kappa_1}{2\epsilon}|\bar{z}_2|^2 - \beta_1|\bar{w}_1|^2 + \left(\frac{\kappa_1 \epsilon}{2} - \beta_2\right)|\bar{w}_2|^2 \quad (35)$$

where $\epsilon_1 > 0$. We then upper bound the inequality by picking the largest coefficient, i.e., $$\bar{\kappa}_1 = \max\left\{\frac{\kappa_1}{2\epsilon}, \left(\frac{\kappa_1 \epsilon}{2} - \beta_2\right)\right\},$$

leading to $$\langle \nabla V(\chi_\varepsilon), \tilde{f}_\varepsilon(\chi_\varepsilon)\rangle \leq \frac{\bar{\kappa}_1}{\alpha_2} V(\chi_\varepsilon)$$

Now, for the analysis across jumps, note that for all $\chi_\varepsilon \in \tilde{D}_\varepsilon \tau = 0$. At jumps, $\tau$ is mapped to some point $v \in [T_1, T_2]$. Then, at jumps, for each $g \in \tilde{G}_\varepsilon$ one has $$V(g) - V(\chi_\varepsilon) = -\bar{\eta}_1^2 + \bar{z}_2^\tau(A_{g_2}^\tau \exp(A_{f_2}^\tau v)P_1 \exp(A_{f_2}v) A_{g_2} - P_1)\bar{z}_2 \leq -\bar{\kappa}_2(|\bar{\eta}_1|^2 + |\bar{z}_2|^2)$$

where $\bar{\kappa}_2$ and $\kappa_2$ are as given in (19), from where we have $$V(g) - V(\chi_\varepsilon) \leq -\bar{\kappa}_2(|\bar{\eta}_1|^2 + |\bar{z}_2|^2) \quad (37)$$

Utilizing the upper bound $\alpha_2$ from the definition of V in $\sqrt{32}$, for all $\chi_\varepsilon \in \tilde{D}_\varepsilon$, one has $V(\chi_\varepsilon) \leq \alpha_2(|\bar{\eta}_1|^2 + |\bar{z}_2|^2 + |\bar{w}|^2)$. Dividing by $\alpha_2$ and rearranging terms, one has $$-(|\bar{\eta}_1|^2 + |\bar{z}_2|^2) \leq -\frac{1}{\alpha_2}V(\chi_\varepsilon) + |\bar{w}|^2$$

Then, by inserting (38) into (37), we obtain $$V(g) - V(\chi_\varepsilon) \leq \bar{\kappa}_2\left(-\frac{1}{\alpha_2}V(\chi_\varepsilon) + |\bar{w}|^2\right)$$

Now, by noting that $$\langle \nabla V(\chi_\varepsilon), \tilde{f}(\chi_\varepsilon)\rangle \leq \frac{\bar{\kappa}_1}{\alpha_2}V(\chi_\varepsilon)$$

and by 39, pick a solution $\tilde{\phi}$ to $\tilde{\mathcal{H}}_\varepsilon$ with initial condition $\tilde{\phi}(0,0) \in \tilde{C}_\varepsilon \cup \tilde{D}_\varepsilon$. Let the jumps of $\tilde{\phi}$ occur at times $(t_j, j) \in \{j': \exists t': (t',j') \in \operatorname{dom} \phi\}$. For each $(t,j) \in [0,t_1] \times \{0\}$ one has $$V(\tilde{\phi}(t,0)) \leq \exp\left(\frac{\bar{\kappa}_1}{\alpha_2}t_1\right)V(\tilde{\phi}(0,0))$$

At $(t_1, 1)$, one has $$V(\tilde{\phi}(t_1, 1)) \leq \left(1 - \frac{\bar{\kappa}_2}{\alpha_2}\right)\exp\left(\frac{\bar{\kappa}_1}{\alpha_2}t_1\right)V(\tilde{\phi}(0,0)) + \bar{\kappa}_2|\bar{w}(t_1, 0)|^2$$

Then, for each $(t,j) \in [t_1, t_2] \times \{1\}$ $$V(\tilde{\phi}(t_1, 1)) = \exp\left(\frac{\bar{\kappa}_1}{\alpha_2}t_2\right)\left(1 - \frac{\bar{\kappa}_2}{\alpha_2}\right)V(\tilde{\phi}(0,0)) + \exp\left(\frac{\bar{\kappa}_2}{\alpha_2}(t_2 - t_1)\right)\bar{\kappa}_2|\bar{w}(t_1, 0)|^2$$

At $(t_2, 2)$, one has $$V(\tilde{\phi}(t_2, 2)) \leq \exp\left(\frac{\bar{\kappa}_1}{\alpha_2}t_2\right)\left(1 - \frac{\bar{\kappa}_2}{\alpha_2}\right)^2 V(\tilde{\phi}(0,0)) + \bar{\kappa}_2\left[\exp\left(\frac{\bar{\kappa}_1}{\alpha_2}(t_2 - t_1)\right)|\bar{w}(t_1, 0)|^2 + |\bar{w}(t_1, 1)|^2\right]$$

A general form of the bound is given by $$V(\tilde{\phi}(t,j)) \leq \exp\left(\frac{\bar{\kappa}_1}{\alpha_2}t_j\right)\left(1 - \frac{\bar{\kappa}_2}{\tilde{\alpha}_1}\right)^j V(\tilde{\phi}(0,0)) + \bar{\kappa}_2\left(\sum_{k=1}^{j}\exp\left(\frac{\bar{\kappa}_1}{\alpha_2}(t_{k+1} - t_k)\right)|\bar{w}(t_k, k-1)|^2\right)$$

Noting that $t_{j+1}-t_j \leq T_2$ and $$\frac{\bar{\kappa}_1}{\alpha_2} > 0,$$

the latter term can be further bounded as $$\bar{\kappa}_2\left(\sum_{k=1}^{j} \exp\left(\frac{\bar{\kappa}_1}{\alpha_2}(t_{k+1} - t_k)\right)|\bar{w}(t_k, k-1)|^2\right) \leq \bar{\kappa}_2 \exp\left(\frac{\bar{\kappa}_1}{\alpha_2}T_2\right) \sup_{(t,j) \in dom\tilde{\phi}} |\bar{w}(t,j)|^2$$

Moreover, since $t_j \leq T_2(j+1)$ and $$\frac{\bar{\kappa}_1}{\alpha_2} > 0,$$

we can also put a stricter bound on the first term in 40p as follows:

$$\exp\left(\frac{\bar{\kappa}_1}{\alpha_2}t_j\right)\left(1 - \frac{\bar{\kappa}_2}{\alpha_2}\right)^j V(\tilde{\phi}(0,0)) \leq$$
$$\exp\left(\frac{\bar{\kappa}_1}{\alpha_2}T_2\right)\left(\exp\left(\frac{\bar{\kappa}_1}{\alpha_2}T_2\right)\left(1 - \frac{\bar{\kappa}_2}{\alpha_2}\right)\right)^j V(\tilde{\phi}(0,0))$$

Thus $$V(\tilde{\phi}(t,j)) \leq \exp\left(\frac{\bar{\kappa}_1}{\alpha_2}T_2\right)\left(\exp\left(\frac{\bar{\kappa}_1}{\alpha_2}T_2\right)\left(1 - \frac{\bar{\kappa}_2}{\alpha_2}\right)\right)^j V(\tilde{\phi}(0,0)) +$$
$$\bar{\kappa}_2 \exp\left(\frac{\bar{\kappa}_1}{\alpha_2}T_2\right) \sup_{(t,j) \in dom\tilde{\phi}} |\bar{w}(t,j)|^2$$

Then, from the result of the Proposition f1 we have (30) with $\alpha_{\bar{w}_1}=\min\{\lambda_{min}(P_2),\lambda_{min}(P_3)\}$ and $\alpha_{\bar{w}_2}=\max\{\lambda_{max}(P_2),\lambda_{max}(P_3)\}$. Now, to improve readability, we have omitted including the use of the notation $V(\tilde{\phi}(t,j))$ when evaluating V along the trajectory for the solution $\phi$ opting instead for the use of the state components of $\chi_\varepsilon$ directly. In particular, we remind the reader that the notation $\bar{w}(t,j)$ corresponds to the $\bar{w}$ component of a solution, i.e., $\phi_{\bar{w}}(t,j)$. Now combining the inequality with (30) and noting $V(\tilde{\phi}(0,0)) \leq \alpha_2|\tilde{\phi}(0,0)|^2_{\tilde{A}_\varepsilon}$ one has for each $(t,j) \in dom\,\phi$ $$|\phi(t,j)|_{\tilde{A}_\varepsilon} \leq \quad (41)$$
$$\sqrt{\frac{\alpha_2}{\alpha_1}}|\phi(0,0)|_{\tilde{A}_\varepsilon} \exp\left(\frac{\bar{\kappa}_1}{2\alpha_2}T_2\right)\left(\exp\left(\frac{\bar{\kappa}_1}{2\alpha_2}T_2\right)\left(1 - \frac{\bar{\kappa}_2}{2\alpha_2}\right)\right)^j +$$
$$\sqrt{\bar{\kappa}_2} \exp\left(\frac{\bar{\kappa}_1}{2\alpha_2}T_2\right)\sqrt{\frac{\alpha_{\bar{w}_2}}{\alpha_{\bar{w}_1}}\exp\left(\frac{-\bar{\gamma}\bar{\beta}}{2\alpha_{\bar{w}_2}}(t+j)\right)^2}|\phi_{\bar{w}}(0,0)|^2_{\tilde{A}_{\varepsilon r}}$$

By the given conditions, the set $\tilde{A}_\varepsilon$ is globally exponentially stable and attractive for $\tilde{\mathcal{H}}_\varepsilon$. Now, by utilizing Lemmas f4 and f6 we can establish global exponential stability to the set $\bar{A}_\varepsilon$ for $\mathcal{H}_\varepsilon$. In particular, Lemma f4 establishes the relation between $\tilde{\mathcal{H}}_\varepsilon$ and $\mathcal{H}_\varepsilon$. In turn, we can then make use of Lemmas f1-f3. where Lemma f1 establishes the reduction from $\mathcal{H}$ to $\mathcal{H}_\varepsilon$, to show that the set $\mathcal{A}$ is globally exponentially stable and attractive for $\mathcal{H}$ in (12).

g. Robustness to Communication Noise. Clock Drift Perturbations, and Error on $\sigma$ Under a realistic scenario, it is often the case that the system is subjected to disturbances. In this section, we present results on input-to-state stability (ISS) of the system when it is affected by different types of disturbances. First, we present an ISS result that considers communication noise. We then present an ISS result on the parameter estimation sub-system when it is subjected to noise on the internal clock output. Finally, we present an ISS result on noise introduced to the desired clock rate reference $\sigma^*$. We will henceforth refer to the following notion of ISS for hybrid systems.

Definition: (Input-to-state stability) A hybrid system $\mathcal{H}$ with input m is in t-to-state stable with respect to a set $\mathcal{A} \in \mathbb{R}^n$ if there exist $\beta \in \mathcal{KL}$ and $\kappa \in \mathcal{K}$ such that each solution pair $(\phi,m)$ to $\mathcal{H}$ satisfies $|\phi(t,j)|_\mathcal{A} \leq \max\{\beta|\phi(0,0)|_\mathcal{A},t+j),\kappa(|m|_\infty)\}$ for each $(t,j)\in$ (i) Robustness to Communication Noise We consider the case when the measurements of the timer $\tilde{\tau}_i$ is affected by noise $m_{e_i} \in \mathbb{R}$, $i \in V$. As a result, the output of each agent is given by $\tilde{\tau}_i + m_{e_i}$. In the presence of this noise, the update law to $\eta_i^+$ in the hybrid controller in (10) becomes $$\eta_i^+ = -\gamma \sum_{k \in N(i)} (\tilde{\tau}_i - \tilde{\tau}_k) - \gamma \sum_{k \in N(i)} (m_{e_i} - m_{e_k})$$

Performing the same change of coordinates, as in the proof of Theorem 1 we show that $\tilde{\mathcal{H}}_\varepsilon$ is ISS to communication noise $m_e = (m_{e_1}, m_{e_2}, \ldots, m_{e_n}) \in \mathbb{R}^n$. Recalling the change of coordinates $\bar{e} = \mathcal{T}^{-1}e$ and $\bar{\eta} = \mathcal{T}^{-1}\eta$, let $\bar{m}_e = \mathcal{T}^{-1}m_e$. The update law $\bar{\eta}^+$, is given by $\bar{\eta}^+ = (0, -\gamma \bar{\mathcal{L}}\bar{e} - \gamma \bar{\mathcal{L}}\bar{m}_e)$ with $\bar{\eta}_1$ unaffected by the communication noise.

Using the update law for $\bar{\eta}$ under the effect of $\bar{m}_e$, we define the perturbed hybrid system $\mathcal{H}$ with state vector $\chi_m := (\bar{z}_1, \bar{z}_2, \bar{w}_1, \bar{w}_2, \tau) \in X_\varepsilon$, where, again $\bar{z}_1 = (\bar{e}_1, \bar{\eta}_1) \bar{z}_2 = (\bar{e}_2, \ldots, \bar{e}_N, \bar{\eta}_2, \ldots, \bar{\eta}_N)$, $\bar{w}_1 = (\bar{\varepsilon}_{a_1}, \bar{\varepsilon}_{\tau_1})$, and $\bar{w}_2 = (\bar{\varepsilon}_{a_2}, \ldots, \bar{\varepsilon}_{a_n}, \bar{\varepsilon}_{\tau_2}, \ldots, \bar{\varepsilon}_{\tau_n})$. Moreover, let $\bar{m}_{\bar{z}_2} = (0, \bar{m}_e)$ The data $(\tilde{C}_m, \tilde{f}_m, \tilde{D}_m, \tilde{G}_m)$ for the new system $\tilde{\mathcal{H}}_m$ is given by $\tilde{f}_m(\chi_m) := \tilde{f}_\varepsilon(\chi_m)$ for each $\chi_m \in \tilde{C}_m$, and $G_m(\chi_m, \bar{m}_e) = G_\varepsilon(\chi_m) - (0, B_g \bar{m}_{\bar{z}_2}, 0, 0, 0)$ for each $\chi_m \in D_m$ where $\tilde{C}_{m_T} := X_\varepsilon$, $\tilde{D}_m := \{\chi_m \in X_m : \tau = 0\}$, and $B_g = [0 \ \gamma \ \bar{\mathcal{L}}]^T$ Theorem 2: Given a strongly connected digraph $\mathcal{G}$, if the parameters $T_2 \geq T_1 > 0$, $\mu > 0$, $h \in \mathbb{R}$, $\gamma > 0$, and positive definite symmetric matrices $P_1$, $P_2$, and $P_3$ are such that 17 and (18) hold, the hybrid system $\mathcal{H}_m$ with input $\bar{m}_e$ is ISS with respect to $\tilde{A}_\varepsilon$ in (27).

See the priority application and [20] for proof.

(ii) Robustness to Perturbations on Internal Clock Drift

In this section, we consider a disturbance $m_{\tau_i^*} \in \mathbb{R}$, $i \in V$ added to the output of the internal clock. Let $y_i^{\tau*} := \tau_i^* + m_{\tau_i^*}$ $i \in V$, define the perturbed internal clock output. Then the dynamics of the original estimation system in (12) under this disturbance becomes $$\dot{\tilde{\tau}} = \hat{a}_i - (\hat{\tau}_i - y_i^{\tau*}), \quad \dot{\hat{a}}_i = -\mu(\hat{\tau}_i - y_i^{\tau*}) \quad \tau \in [0, T_2]$$
$$\tilde{\tau}_i^+ = \tilde{\tau}_i, \qquad \hat{a}_i^+ = \hat{a}_i \qquad \tau = 0$$

In error coordinates $\varepsilon_{\hat{a}_i} = a_i - \hat{a}_i$, $\varepsilon_{\tau_i} = \hat{\tau}_i - \tau_i^*$, this leads to $$\dot{\varepsilon}_{\tau_i} = -\varepsilon_{\tau_i} - \varepsilon_{a_i} + m_{\tau_i^*}, \quad \dot{\varepsilon}_{\hat{a}_i} = \mu\varepsilon_{\tau_i} - \mu m_{\tau_i^*} \quad \tau \in [0, T_2]$$

$$\varepsilon_{\tau_i}^+ = \varepsilon_{\tau_i}, \qquad \varepsilon_{\hat{a}_i}^+ = \varepsilon_{\hat{a}_i} \qquad \tau = 0$$

Similar to the result presented in Proposition 5.1 for the estimation sub-system we will consider the same reduction $\tilde{\mathcal{H}}_{\varepsilon_r}$ that now captures the perturbation. Recall the coordinate transformations $\overline{\varepsilon}_a = \mathcal{T}^{-1}\varepsilon_a$ and $\overline{\varepsilon}_\tau = \mathcal{T}^{-1}\varepsilon_\tau$ for the respective internal clock and parameter estimation errors. Moreover, recall $\overline{w} = (\overline{w}_1, \overline{w}_2)$ where $\overline{w}_1 = (\overline{\varepsilon}_{a_1}, \overline{\varepsilon}_{\tau_1})$ and $\overline{w}_2 = (\overline{\varepsilon}_{a_2}, \ldots, \overline{\varepsilon}_{a_n}, \overline{\varepsilon}_{\tau_2}, \ldots, \overline{\varepsilon}_{\tau_n})$. Let $\overline{m}_{\tau^*} = \mathcal{T}^{-1}m_{\tau^*}$ and $\overline{q} = (\overline{q}_1, \overline{q}_2)$ where $\overline{q}_1 = (\overline{m}_{\tau_1^*}, m_{\tau_1^*})$ and $\overline{q}_2 = (\overline{m}_{\tau_2^*}, \ldots, \overline{m}_{\tau_n^*}, \overline{m}_{\tau_2^*}, \ldots, \overline{m}_{\tau_n^*})$. Now, consider the reduced coordinates $\chi_{m_r} := (\overline{w}_1, \overline{w}_2, \tau) \in \mathbb{R}^n \times \mathbb{R}^n \times [0, T_2] =: X_\varepsilon$. The data of this reduced system is given by $\tilde{\mathcal{H}}_{m_r} = (\tilde{C}_\varepsilon, \tilde{f}_\varepsilon, \tilde{D}_\varepsilon, \tilde{G}_\varepsilon)$ where $\tilde{f}_{m_r}(\chi_{m_r}, \overline{q}) := \tilde{f}_\varepsilon(\chi_{m_r}) + (B_{m_1}\tilde{q}_1, B_{m_2}\tilde{q}_2, 0)$ for each $\chi_{m_r} \in \tilde{C}_{m_r}$ and $\tilde{G}_{m_r}(\chi_{m_r}) := (\overline{w}_1, \overline{w}_2, [T_1, T_2])$ for each $\chi_{m_r} \in \tilde{D}_{m_r}$ where $\tilde{C}_{m_r} := X_\varepsilon \tilde{D}_{m_r} := \{\chi_m \in X_\varepsilon : \tau = 0\}$, and $B_{m_1} = ([\mu, 0], [0, 1])$ $B_{m_2} = ([\mu I, 0], [0, I])$ Theorem 3: If there exists a positive scalar $\mu$ and positive definite symmetric matrices $P_2$, $P_3$ such that the conditions in 16p hold, the hybrid system $\mathcal{H}_{m_r}$ with input $\overline{m}_{\tau^*}$ is ISS with respect to $\mathcal{A}_{\varepsilon_r}$ given in (29)

The proof of this result is established by picking a solution to the model reduction $\tilde{\mathcal{H}}_{\varepsilon_r}$, integrating the disturbance that is treated as an input to the system, and then bounding the integral. A proof of this result can be found in [20].

(iii) Robustness to Error on $\sigma$

In this section, we consider a disturbance on $\sigma^*$ to capture the scenario where $\sigma^*$ is not precisely known, i.e., $\sigma_i \neq \sigma^*$. Let $\varepsilon_{\sigma_i} = \sigma_i - \sigma^*$ represent the error between the injected and the ideal clock rate. Treating $\varepsilon_\sigma$ as a perturbation to the system $\mathcal{H}_\varepsilon$, one has $\dot{x}_\varepsilon = f_\varepsilon(x_\varepsilon) + (\varepsilon_\sigma, 0, 0, 0, 0)$ for each $x_\varepsilon \in C_\varepsilon$ and $x_\varepsilon^+ \in (e, -\gamma \mathcal{L} e, \varepsilon, \varepsilon_\tau, [T_1, T_2])$ for each $x_\varepsilon \in D_\varepsilon$. To show how the perturbation affects $\tilde{\mathcal{H}}_\varepsilon$, let $\overline{\varepsilon}_\sigma = \mathcal{T}^{-1}\varepsilon_\sigma$, then let $\overline{m}_\sigma = (\overline{m}_{\sigma_1}, \overline{m}_{\sigma_2})$ where $\overline{m}_{\sigma_1} = \overline{\varepsilon}_{\sigma_1}$ and $\overline{m}_{\sigma_2} = (\overline{\varepsilon}_{\sigma_2}, \ldots, \overline{\varepsilon}_{\sigma_n})$ We define this perturbed hybrid system $\tilde{\mathcal{H}}_{m_\sigma}$ with state vector $\chi_{m_\sigma} := (\overline{z}_1, \overline{z}_2, \overline{w}_1, \overline{w}_2, \tau) \in X_\varepsilon$. Its dynamics are given by the new system $\mathcal{H}_{m_\sigma} = (\tilde{C}_{m_\sigma}, \tilde{f}_{m_\sigma}, \tilde{D}_{m_\sigma}, \tilde{G}_{m_\sigma})$ with data $\tilde{f}_{m_\sigma}(\chi_{m_\sigma})$ for each $\chi_{m_\sigma} \in \tilde{C}_{m_\sigma} := X_\varepsilon$ and $\tilde{G}_{m_\sigma}(\chi_{m_\sigma})$ for each $\chi_{m_\sigma} \in \tilde{D}_{m_\sigma} := \{\chi_{m_\sigma} \in X_\varepsilon : \tau = 0\}$ where $\tilde{f}_{m_\sigma}(\chi_{m_\sigma}, \overline{m}_\sigma) := \tilde{f}_\varepsilon(\chi_{m_\sigma}) + (\overline{m}_{\sigma_1}, \overline{m}_{\sigma_2}, 0, 0, 0)$ and $\tilde{G}_{m_\sigma}(\chi_{m_\sigma}) := \tilde{G}_\varepsilon(\chi_{m_\sigma})$ leading to the following result.

Theorem 4: Given a strongly connected digraph $\mathcal{G}$, if the parameters $T_2 \geq T_1 > 0$, $\mu > 0$, $h \in \mathbb{R}$, $\gamma > 0$, and positive definite symmetric matrices $P_1$, $P_2$, and $P_3$ are such that [T] and (18) hold, the hybrid system $\mathcal{H}_{m_\sigma}$ with input $\overline{m}_\sigma$ is ISS with respect to $\tilde{\mathcal{A}}_\varepsilon$ given in (27). The proof of this result largely follows the same approach used in the proof of Theorem 2 namely, a Lyapunov analysis using the function candidate V in (31). Since the disturbance is present during flows, we show that the derivative of V can be upper bounded resulting in a bounded disturbance in V when evaluated along a given solution to $\mathcal{H}_{m_\sigma}$; see [20] for more details.

h. Comparisons

In this section we compare our algorithm to several contemporary consensus-based clock synchronization algorithms from the literature through a numerical example. In particular, we consider a four agent setting and simulate each algorithm presented in [15] (PI-Consensus), [17] (RandSync), and [1] (Average TimeSync) to our hybrid algorithm HyNTP as in (12).

Consider N=4 agents with clock dynamics as in 4 and 55 over a strongly connected graph with the following adjacency matrix $\mathcal{G}_A = [0,1,0,1], [1,0,1,0], [0,1,0,1], [1,0,1,0]$ and aperiodic communication events such that successive communications events are lower and upper bounded by $T_1 = 0.1$ and $T_2 = 0.5$, respectively. The initial conditions for the clock rates $\overline{a}_i$ and adjustable clock values $\overline{\tau}_i$ for each $i \in V$ has been randomly chosen within the intervals (0.5,1.5) and (0,200), respectively. Moreover, consider the case where the system is subjected to a communication noise $m_{\tau_i}(t,j) \in (0,1)$ on the clock measurements. FIGS. 4E, and 4F show the trajectories of $\overline{\tau}$ and $\overline{a}_i$, respectively, for agents $i \in \{1,2,3,4\}$ for the HyNTP algorithm and each of the comparison algorithms under consideration.

For the HyNTP algorithm, setting $\sigma^* = 1$, it can be found that the parameters $h = -2$, $\mu = 9$, $\gamma = 0.06$ and $\epsilon = 4.752$ with suitable matrices $P_1$, $P_2$, and $P_3$ satisfy conditions 17} and (18) in Theorem 1 with $\overline{\kappa}_1 = 2.02$, $\kappa_1 = 19.22$, $\overline{\kappa}_2 = 1$, and $\alpha_2 = 44.03$ 5. Advantages and Improvements The present disclosure describes a hybrid clock synchronization algorithm with tractable design conditions. In particular, the present disclosure describes a distributed hybrid algorithm that exponentially synchronizes a set of clocks connected over a network via measurements given at aperiodic time instants. We present a distributed hybrid algorithm to synchronize the network clocks in the presence of non-ideal clock skews while capturing the continuous and impulsive dynamics of the network into a hybrid model. To achieve synchronization with a common rate of change, the algorithm also allows for local estimation of the skew of the internal clock at each agent. The use of a hybrid systems model to solve the problem under consideration allows for the application of a Lyapunov-based analysis to show stability of a desired set of interest. Using results from [19], we show that, via a suitable change of coordinates, our distributed hybrid clock synchronization algorithm guarantees synchronization of the timers, exponentially fast. HyNTP is a distributed hybrid algorithm that synchronizes the clock rates and offsets to solve the problem outlined herein. Moreover, we present a hybrid systems model to capture the network dynamics for the case of synchronous and aperiodic communication events. We presented a reduced model of the system and a subsequent auxiliary model that is generated from an appropriately defined change of coordinates. With the auxiliary model, we present necessary and sufficient conditions for which stability of a compact set, representing synchronization, holds. Moreover, we show that the system is robust to perturbations on the communication noise, clock drift, and the desired clock rate reference. We compare the merits of our algorithm to competing algorithms in the literature.

Further information on one or more embodiments of the present invention can be found in the technical report [20].

6. Device and Method Embodiments

Illustrative, non-exclusive examples of inventive subject matter according to the present disclosure are described in the following enumerated clauses (referring also to reference numbers in FIGS. 1-7):

1. A system 500, comprising:
   a network 200 of nodes 206 each including a clock 202 implemented in hardware;
   a communication link 212 connecting the nodes 206 so as to share information between the nodes 206; and
   one or more computers 602 connected to the communication link 210 and executing an algorithm that learns one or more skews of each of the clocks 202 from the information, wherein the one or more skews are used to determine one or more corrective actions applied to one or more of the clocks 202 so as to synchronize the clocks to a common clock rate.

2. The system of clause 1, wherein the algorithm learns using an estimator that estimates the skews using the information.

3. The system of clause 1 or clause 2, wherein the algorithm uses parameters and coordinates selected to guarantee exponentially fast and stable synchronization of the clocks to the common clock rate.

4. The system of any of the clauses 1-3, wherein the algorithm learns the skew and synchronizes the clocks using a closed loop hybrid state-feedback comprising:
communicating the information between a plurality of the nodes at one or more communication event times T1, T2;
using the information to estimate the one or more skews of each of the clocks between the communication event times so that the estimates can be used to determine the corrective actions; and
at one or more of the communication event times, adjusting one or more clock rates of one or more of the clocks using the corrective actions so that the clocks are synchronized to the common clock rate.

5. The system of any of the clauses 1-4, wherein:
the communication link connects one of the nodes to one or more other ones of the nodes connected to the one of the nodes; and
the information shared across the communication link represents a comparison of the skew of the clock at the one of the nodes as compared to one or more skews of the clocks at each of the other nodes connected to the one of the nodes.

6. The system of any of the clauses 1-5, wherein the computers synchronize the clocks by modeling the network as a hybrid system H comprising data and using the algorithm to generate the data:

$$\mathcal{H}: \begin{cases} \dot{x} = f(x) \\ x^+ = g(x) \end{cases}$$

wherein:
x is a system state representing the skews of the clocks,
$x^+$ is the system state after receiving the information at the communication event times,
g(x) is a function describing how the system state is impulsively updated at the communication event times,
$\dot{x}$ is a time rate of change of the system state determined by the algorithm between the communication event times,
f(x) is a function describing a continuous time evolution of the system state between the communication event times, and
the algorithm determines the corrective actions required to achieve a maximal solution to the hybrid system wherein the skews of the clocks converge to zero exponentially fast and the clock rates of the clock converge to the common clock rate exponentially fast.

7. The system of clause 6, wherein the function g(x) takes into account interconnectivity 214 of the nodes in the network and communication link shares the information between the nodes connected according to the interconnectivity.

8. The system of clause 6 or 7, wherein the computers represent the network and the interconnectivity using a digraph represented using an adjacency matrix and the function g(x) applies the adjacency matrix to the system state.

9. The system of any of the clauses 6-8, comprising a plurality n of the clocks, wherein:
n is an integer such that n>1,
the nodes comprise n nodes each connected to one of the clocks each identified with an integer i such that $1 \leq i \leq n$, each of the clocks connected to the $i^{th}$ node identified as the $i^{th}$ clock having a clock rate $\tau_i$ varying as a function of time according to a drift $a_i$;
one or more of the nodes connected to the $i^{th}$ node are identified with an integer k such that $1 \leq k \leq i$, each of the clocks connected to the $k^{th}$ node identified as the $k^{th}$ clock having a clock rate $\tau_k$ varying as a function of time according to a drift $a_k$; and
the one or more computers:
implement a plurality of adjustable clocks each identified with the integer i or the integer k so that the $i^{th}$ adjustable clock is connected to the $i^{th}$ clock and one or more $k^{th}$ adjustable clocks are connected the $i^{th}$ adjustable clock, the $i^{th}$ adjustable clock having an adjustable clock rate $\tilde{\tau}_i = a_i + u_i$ where $u_i$ is a control input and the $k^{th}$ adjustable clock having an adjustable clock rate $\tilde{\tau}_k$;
represent the network using a digraph comprising the plurality i of the nodes,
provide feedback comprising, at each of the i nodes:
receiving, at each of the communication event times, the it from each of the k adjustable clocks connected to the $i^{th}$ node according to the digraph;
updating, at the plurality of communication event times, the system state and a control variable $\eta_i$, wherein the control variable $\eta_i$ is associated with $\Sigma \tilde{\tau}_i - \tilde{\tau}_k$ over all k nodes connected according to the digraph;
determining a time rate of change of the system state using a continuous-time linear function between the communication event times to obtain an estimate $\hat{a}_i$ of the drift $a_i$ of the $i^{th}$ clock; and
at each of the communication event times and for one or more of the i clocks ($1 \leq i \leq n$), determine the one of the corrective actions $u_i = \eta_i - \hat{a}_i + \sigma^*$ applied to the clock rate $\tau_i$ of the $i^{th}$ clock that reduces the drift $a_i$ so as to converge the clock rate $\tau_i$ to the common clock rate $\sigma^*$.

10. The system of clause 9, wherein:
determining the time rate of change of the system state between communication event times comprises setting:

$$\left. \begin{aligned} \dot{u}_i &= h_i \eta_i - \mu_i(\hat{\tau}_i - \tau_i^*), \dot{\eta}_i = h_i \eta_i \\ \dot{\hat{a}}_i &= -\mu_i(\hat{\tau}_1 - \tau_i^*), \dot{\tilde{\tau}}_i = \hat{a}_i - (\hat{\tau}_i - \tau_i^*) \end{aligned} \right\} \tau \in [0, T_2];$$

and updating the system state at the communication event times comprises setting:

$$\left. \begin{aligned} u_i^+ &= -\gamma_i \sum_{k \in N(i)} (\tilde{\tau}_i - \tilde{\tau}_k) - \hat{a}_i + \sigma^*, \hat{a}_i^+ = \hat{a}_i \\ \eta_i^+ &= -\gamma_i \sum_{k \in N(i)} (\tilde{\tau}_i - \tilde{\tau}_k), \hat{\tau}_i^+ = \hat{\tau}_i \end{aligned} \right\} \tau = 0$$

where h, μ and γ are parameters set to aid convergence of the clock rate $\tau_i$ to the common clock rate σ*, $e_i - e_k = \tilde{\tau}_i - \tilde{\tau}_k$, and $u_i, \eta_i, \tau_i, \hat{a}_i$ and $\tilde{\tau}_i$ are variables representing the system state.

11. The system of any of the clauses 6-10, wherein the system state is represented in a coordinate system wherein the f(x) and the g(x) can be linearized, the interconnectivity between the nodes is represented using a Laplacian matrix, and a global exponential stability of the hybrid system's solutions in the coordinate system implies a global exponential stability of a synchronization of the clocks obtained using the algorithm.

12. The system of any of the clauses 6-11, wherein the system state is represented in the coordinate system wherein the system state includes error variables representing one or more errors in one or more estimates of the skews.

13. The system of any of the clauses 6-12, wherein the system state is represented in the coordinate system such that $x = x_\varepsilon$, $f(x) = f_\varepsilon(x_\varepsilon)$, and $g(x) = G_\varepsilon(x_\varepsilon)$ and:

$$f_\varepsilon(x_\varepsilon) := \begin{bmatrix} \eta + \epsilon_a \\ h\eta \\ \mu\varepsilon_\tau \\ -\varepsilon_\tau - \varepsilon_a \\ -1 \end{bmatrix}, G_\varepsilon(x_\varepsilon) := \begin{bmatrix} e \\ -\gamma \mathcal{L} e \\ \varepsilon_a \\ \varepsilon_\tau \\ [T_1, T_2] \end{bmatrix}$$

where L is the Laplacian matrix obtained from the adjacency matrix, $\varepsilon_a$ represents the error in the estimate of the $i^{th}$ clock's drift $a_i$ in the coordinate system, $\varepsilon_\tau$ represents the error in the estimate of the $i^{th}$ clock's state $\tau_i$ in the coordinate system, and $[T_1, T_2]$ is the time interval between the communication events $T_1$ and $T_2$.

14. The system of any of the clauses 4-13, wherein the communication event times are periodic, aperiodic, synchronous, asynchronous, or intermittent.

15. The system 500 of any of the clauses 1-14, wherein the nodes 206 each include a device 502 including or coupled to one of the clocks 202, and each of the devices 502 comprise at least one machine selected from a robot 506, a vehicle 508, a sensor 510, a second computer 504, an actuator, an intelligent agent, a device using distributed optimization, or a smart device 512 in one or more smart buildings.

16. The system 500 of any of the clauses 1-14, wherein the nodes 206 each include or are coupled to a device 502 including one of the clocks 202, and each of the devices 502 comprise at least one machine 506 selected from performing automated manufacturing, devices controlled by a control system, devices used in banking, devices supplying power or controlling power distribution, or devices in an automotive or aerospace system.

17. The system of clauses 15 or 16, wherein the devices are heterogeneously distributed devices and the system comprises a heterogeneously distributed system.

18. A computer implemented method of synchronizing clocks in a system, comprising:

linking 100 a network of nodes each comprising a clock so as to share information between the nodes, each of the clocks implemented in hardware in a device;

executing 102, in one or more computers connected to the network, an algorithm that learns a skew of each of the clocks from the information so as to determine one or more corrective actions;

applying 104 the corrective actions to one or more of clocks to synchronize the clocks to a common clock rate.

19. The method of clause 18, wherein the algorithm learns the skew and synchronizes the clocks to the common clock using a hybrid state-feedback comprising:

communicating the information between the nodes at communication event times T1, T2;

using the information to estimate the skew of each of the clocks between the communication event times;

at one or more of the communication event times, adjusting a clock rate of one or more of the clocks using the skew so that the clocks are synchronized to the common clock rate.

20. The method of clause 18 or 19, wherein the algorithm uses parameters and coordinates selected to guarantee exponentially fast and stable synchronization of the clocks to the common clock rate.

21. The method of any of the clauses 18-20, wherein the computers synchronize the clocks by modeling the network as a hybrid system H comprising data and using the algorithm to generate the data:

$$\mathcal{H} : \begin{cases} \dot{x} = f(x) \\ x^+ = g(x) \end{cases}$$

wherein:

x is a system state representing the skew of the clocks, $x^+$ is the system state after a jump obtained from the information at the communication event times and g(x) is a function describing how the system state is impulsively updated at the communication event times, $\dot{x}$ is the time rate of change of the system state determined by the algorithm between the communication event times and f(x) is a function describing the continuous time evolution of the system state between the communication event times, and the algorithm determines the corrective action required to achieve a maximal solution to the hybrid system wherein the skew of the clocks converges to zero exponentially fast and the clock rates of the clock converge to the common clock rate exponentially fast.

22. The method of any of the clauses 18-22 implemented using the system of any of the clauses 1-17 and/or further including the features of any of the clauses 1-17.

23. The method or system of any of the clauses 1-22 wherein the clock rate comprises a frequency at which the clock generator of a processor can generate pulses, which are used to synchronize the operations of its components, and is used as an indicator of the processor's speed. It is measured in clock cycles per second or its equivalent, the SI unit hertz (Hz).

REFERENCES

The following references are incorporated by reference herein.

[1] L. Schenato and F. Fiorentin, "Average timesynch: A consensus-based protocol for clock synchronization in wireless sensor networks," Automatica, vol. 47, no. 9, pp. 1878-1886, 2011.

[2] S. Graham and P. Kumar, "Time in general-purpose control systems: The control time protocol and an experimental evaluation," in 2004 43 rd IEEE Conference on Decision and Control (CDC) (IEEE Cat. No. 04CH37601), vol. 4, pp. 4004-4009, IEEE, 2004.

[3] Y.-C. Wu, Q. Chaudhari, and E. Serpedin, "Clock synchronization of wireless sensor networks" IEEE Signal Processing Magazine, vol. 28, no. 1, pp. 124-138, 2010

[4] J. R. Vig, "Introduction to quartz frequency standards," tech. rep., Army Lab Command Fort Monmouth NJ Electronics Technology and Devices Lab, 1992

[5] N. M. Freris, S. R. Graham, and P. Kumar, "Fundamental limits on

[6] D. L. Mills, "Internet time synchronization: the network time protocol," IEEE Transactions on communications, vol. 39, no. 10, pp. 1482-1493, 1991.

[7] J. Elson, L. Girod, and D. Estrin, "Fine-grained network time synchronization using reference broadcasts" SIGOPS Oper. Syst. Rev., vol. 36, no. SI, pp. 147-163, 2002.

[8] S. Ganeriwal, R. Kumar, and M. B. Srivastava, "Timing-sync protocol for sensor networks" in Proceedings of the 1st International Conference on Embedded Networked Sensor Systems, SenSys '03, (New York, N.Y., USA), pp. 138-149, ACM, 2003

[9] R. Olfati-Saber and R. M. Murray, "Consensus problems in networks of agents with switching topology and time-delays" IEEE Transactions on Automatic Control, vol. 49, pp. 1520-1533, September 2004.

[10] J. A. Fax and R. M. Murray, "Information flow and cooperative control of vehicle formations" IEEE Transactions on Automatic Control, vol. 49, pp. 1465-1476, September 2004.

[11] M. Cao, A. S. Morse, and B. D. Anderson, "Reaching a consensus in a dynamically changing environment: A graphical approach," SIAM Journal on Control and Optimization, vol. 47, no. 2, pp. 575-600, 2008.

[12] J. He, P. Cheng, L. Shi, and J. Chen, "Time synchronization in wsns: A maximum value based consensus approach," in 2011 50th IEEE Conference on Decision and Control and European Control Conference, pp. 7882-7887, December 2011.

[13] E. Garone, A. Gasparri, and F. Lamonaca, "Clock synchronization protocol for wireless sensor networks with bounded communication delays," Automatica, vol. 59, pp. 60-72, 2015.

[14] Y. Kikuya, S. M. Dibaji, and H. Ishii, "Fault tolerant clock synchronization over unreliable channels in wireless sensor networks" IEEE Transactions on Control of Network Systems, vol. 5, no. 4, pp. 1551-1562, 2017

[15] R. Carli, A. Chiuso, L. Schenato, and S. Zampieri, "A PI consensus controller for networked clocks synchronization," IFAC Proceedings Volumes, vol. 41, no. 2, pp. 10289-10294, 2008.

[16] R. Carli and S. Zampieri, "Network clock synchronization based on the second-order linear consensus algorithm," IEEE Transactions on Automatic Control, vol. 59, pp. 409-422, February 2014

[17] S. Bolognani, R. Carli, E. Lovisari, and S. Zampieri, "A randomized linear algorithm for clock synchronization in multi-agent systems," IEEE Transactions on Automatic Control, vol. 61, no. 7, pp. 1711-1726, 2015.

[18] S. Phillips, Y. Li, and R. G. Sanfelice, "A hybrid consensus protocol for pointwise exponential stability with intermittent information" IFACPapersOnLine, vol. 49, no. 18, pp. 146-151, 2016.

[19] R. Goebel, R. G. Sanfelice, and A. R. Teel, Hybrid Dynamical Systems: Modeling, Stability, and Robustness. Princeton University Press, 2012.

[20] M. Guarro and R. G. Sanfelice, "HyNTP: A distributed hybrid algorithm for time synchronization," 2021. URL: https://arxiv.org/abs/2105.00165.

[21] M. Guarro and R. G. Sanfelice, "HyNTP: An adaptive hybrid network time protocol for clock synchronization in heterogeneous distributed systems," in 2020 American Control Conference (ACC), pp. 1025-1030, 2020.

[22] F. Ferrante, F. Gouaisbaut, R. G. Sanfelice, and S. Tarbouriech, "State estimation of linear systems in the presence of sporadic measurements" Automatica, vol. 73, pp. 101-109, 2016

[23] R. G. Sanfelice, Hybrid Feedback Control. New Jersey: Princeton University Press, 2021.

[24] C. D. Godsil and G. F. Royle, Algebraic Graph Theory. 2001.

[25] Y. Kikuya, S. M. Dibaji, and H. Ishii, "Fault tolerant clock synchronization over unreliable channels in wireless sensor networks" IEEE Transactions on Control of Network Systems, pp. 1-1, 2018.

[26] K. Narendra and A. Annaswamy, "A new adaptive law for robust adaptation without persistent excitation," IEEE Transactions on Automatic Control, vol. 32, pp. 134-145, February 1987.

[27] R. G. Sanfelice, R. Goebel, and A. R. Teel, "Invariance principles for hybrid systems with connections to detectability and asymptotic stability," IEEE Transactions on Automatic Control, vol. 52, no. 12 p. 2282-2297, 2007

[28] K. S. Yildirim, R. Carli, and L. Schenato, "Adaptive proportionalintegral clock synchronization in wireless sensor networks," IEEE Transactions on Control Systems Technology, vol. 26, no. 2, pp. 610-623, 2017

[29] Y. Li, S. Phillips, and R. G. Sanfelice, "Robust distributed estimation for linear systems under intermittent information," IEEE Transactions on Automatic Control, vol. 63, pp. 973-988, April 2018.

[30] C. Liao and P. Barooah, "Distributed clock skew and offset estimation from relative measurements in mobile networks with markovian switching topology," Automatica, vol. 49, no. 10, pp. 3015-3022, 2013.

[31] Q. M. Chaudhari, E. Serpedin, and K. Qarage, "On maximum likelihood estimation of clock offset and skew in networks with exponential delays" IEEE Transactions on Signal Processing, vol. 56, no. 4, pp. 1685-1697, 2008

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. A system, comprising:
a network of nodes each including a clock implemented in hardware;
a communication link connecting the nodes so as to share information between the nodes; and one or more computers connected to the communication link and executing an algorithm that learns one or more skews of each of the clocks from the information, wherein:

the one or more skews are used to determine one or more corrective actions applied to one or more of the clocks so as to synchronize the clocks to a common clock rate, the computers synchronize the clocks by modeling the network as a hybrid system H comprising data and using the algorithm to generate the data:

$$\mathcal{H}: \begin{cases} \dot{x} = f(x) \\ x^+ = g(x) \end{cases}$$

wherein:

x is a system state representing the skews of the clocks, $x^+$ is the system state after receiving the information at the communication event times, g(x) is a function describing how the system state is impulsively updated at the communication event times, $\dot{x}$ is a time rate of change of the system state determined by the algorithm between the communication event times, f(x) is a function describing a continuous time evolution of the system state between the different communication event times, and the algorithm determines the corrective actions required to achieve a maximal solution to the hybrid system wherein the skews of the clocks converge to zero exponentially fast and the clock rates of the clock converge to the common clock rate exponentially fast.

2. The system of claim 1, wherein the algorithm learns using an estimator that estimates the skews using the information.

3. The system of claim 1, wherein the nodes each include a device including one of the clocks, and each of the devices comprise at least one machine selected from performing automated manufacturing, devices controlled by a control system, devices used in banking, devices supplying power or controlling power distribution, or devices in an automotive or aerospace system.

4. The system of claim 3, wherein the devices are heterogeneously distributed devices and the system comprises a heterogeneously distributed system.

5. The system of claim 1, wherein:

the communication link connects one of the nodes to one or more other ones of the nodes connected to the one of the nodes; and the information shared across the communication link represents a comparison of the skew of the clock at the one of the nodes as compared to one or more skews of the clocks at each of the other nodes connected to the one of the nodes.

6. The system of claim 1, wherein the computers represent the network and the interconnectivity using a digraph represented using an adjacency matrix and the function g(x) applies the adjacency matrix to the system state.

7. The system of claim 1, wherein the function g(x) takes into account interconnectivity of the nodes in the network and communication link shares the information between the nodes connected according to the interconnectivity.

8. The system of claim 1, comprising a plurality n of the clocks, wherein:

n is an integer such that n >1, the nodes comprise n nodes each connected to one of the clocks each identified with an integer i such that $1 \le i \le n$, each of the clocks connected to the $i^{th}$ node identified as the $i^{th}$ clock having a clock rate $\tau_i$ varying as a function of time according to a drift $a_i$;

one or more of the nodes connected to the $i^{th}$ node are identified with an integer k such that $1 \le k \le i$, each of the clocks connected to the $k^{th}$ node identified as the $k^{th}$ clock having a clock rate $\tau_k$ varying as a function of time according to a drift $a_k$; and the one or more computers:

implement a plurality of adjustable clocks each identified with the integer i or the integer k so that the $i^{th}$ adjustable clock is connected to the $i^{th}$ clock and one or more $k^{th}$ adjustable clocks are connected the $i^{th}$ adjustable clock, the $i^{th}$ adjustable clock having an adjustable clock rate $\tilde{\tau}_i = a_i + u_i$ where $u_i$ is a control input and the $k^{th}$ adjustable clock having an adjustable clock rate $\tilde{\tau}_k$;

represent the network using a digraph comprising the plurality i of the nodes, provide feedback comprising, at each of the i nodes:

receiving, at each of the communication event times, the $\tilde{\tau}_k$ from each of the k adjustable clocks connected to the $i^{th}$ node according to the digraph;

updating, at the plurality of communication event times, the system state and a control variable $\eta_i$, wherein the control variable $\eta_i$ is associated with $\Sigma \tilde{\tau}_i - \tilde{\tau}_k$ over all k nodes connected according to the digraph;

determining a time rate of change of the system state using a continuous-time linear function between the communication event times to obtain an estimate $\hat{a}_i$ of the drift $a_i$ of the $i^{th}$ clock; and at each of the communication event times and for one or more of the i clocks ($1 \le i \le n$), determine the one of the corrective actions $u_i = \eta_i - \hat{a}_i + \sigma^*$ applied to the clock rate $\tau_i$ of the $i^{th}$ clock that reduces the drift a, so as to converge the clock rate $\tau_i$ to the common clock rate $a^*$.

9. The system of claim 8, wherein the nodes each include a device including one of the clocks, and each of the devices comprise at least one machine selected from a robot, a vehicle, a sensor, a second computer, an actuator, an intelligent agent, a device using distributed optimization, or a smart device in one or more smart buildings.

10. The system of claim 8, wherein:

determining the time rate of change of the system state between communication event times comprises setting:

$$\left. \begin{aligned} \dot{u}_i &= h_i \eta_i - \mu_i(\hat{\tau}_1 - \tau_i^*), \dot{\eta}_i = h_i \eta_i \\ \dot{\hat{a}}_i &= -\mu_i(\hat{\tau}_1 - \tau_i^*), \dot{\hat{\tau}}_i = \hat{a}_i - (\hat{\tau}_i - \tau_i^*) \end{aligned} \right\} \tau \in [0, T_2];$$

and updating the system state at the communication event times comprises setting:

$$\left. \begin{aligned} u_i^+ &= -\gamma_i \sum_{k \in N(i)} (\tilde{\tau}_i - \tilde{\tau}_k) - \hat{a}_i + \sigma^*, \hat{a}_i^+ = \hat{a}_i \\ \eta_i^+ &= -\gamma_i \sum_{k \in N(i)} (\tilde{\tau}_i - \tilde{\tau}_k), \hat{\tau}_i^+ = \hat{\tau}_i \end{aligned} \right\} \tau = 0$$

where h, μ and y are parameters set to aid convergence of the clock rate $\tau_i$ to the common clock rate σ*, $e_i - e_k = \tilde{\tau}_i - \tilde{\tau}_k$, and $u_i$, $\tau_i$, $\tilde{\tau}_i$, $\hat{a}_i$, and $\tilde{\tau}_i$, are variables representing the system state.

11. The system of claim 8, wherein the system state is represented in a coordinate system wherein the f(x) and the g(x) can be linearized, an interconnectivity between the nodes is represented using a Laplacian matrix, and a global exponential stability of the hybrid system's solutions in the coordinate system implies a global exponential stability of a synchronization of the clocks obtained using the algorithm.

12. The system of claim 8, wherein the system state is represented in the coordinate system wherein the system state includes error variables representing one or more errors in one or more estimates of the skews.

13. The system of claim 12, wherein the system state is represented in the coordinate system such that $x = x_\varepsilon$, $f(x) = f_\varepsilon (x_\varepsilon)$, and $g(x) = G_\varepsilon(x_\varepsilon)$ and:

$$f_\varepsilon(x_\varepsilon) := \begin{bmatrix} \eta + \epsilon_a \\ h\eta \\ \mu \varepsilon_\tau \\ -\varepsilon_\tau - \varepsilon_a \\ -1 \end{bmatrix}, G_\varepsilon(x_\varepsilon) := \begin{bmatrix} e \\ -\gamma \mathcal{L} e \\ \varepsilon_a \\ \varepsilon_\tau \\ [T_1, T_2] \end{bmatrix}$$

where L is the Laplacian matrix obtained from the adjacency matrix, $\varepsilon_a$ represents the error in the estimate of the $i^{th}$ clock's drift a, in the coordinate system, $\varepsilon_\tau$ represents the error in the estimate of the $i^{th}$ clock's state $\tau_i$ in the coordinate system, and $[T_1, T_2]$ is the time interval between the communication events $T_1$ and $T_2$.

14. The system of claim 8, wherein the communication event times are periodic aperiodic or intermittent.

15. A system, comprising:
a network of nodes each including a clock implemented in hardware;
a communication link connecting the nodes so as to share information between the nodes; and
one or more computers connected to the communication link and executing an algorithm that learns one or more skews of each of the clocks from the information, wherein:
the one or more skews are used to determine one or more corrective actions applied to one or more of the clocks so as to synchronize the clocks to a common clock rate,
the algorithm learns the skew and synchronizes the clocks using a closed loop hybrid state-feedback comprising:
communicating the information between a plurality of the nodes at one or more of the communication event times;
using the information to estimate the one or more skews of each of the clocks between the communication event times so that the estimates can be used to determine the corrective actions; and
at one or more of the communication event times, adjusting one or more clock rates of one or more of the clocks using the corrective actions so that the clocks are synchronized to the common clock rate.

16. The system of claim 15, wherein the algorithm uses parameters and coordinates selected to guarantee exponentially stable synchronization of the clocks to the common clock rate.

17. A computer implemented method of synchronizing clocks in a system, comprising:
linking a network of nodes each comprising a clock so as to share information between the nodes, each of the clocks implemented in hardware in a device;
executing, in one or more computers connected to the network, an algorithm that learns a skew of each of the clocks from the information so as to determine one or more corrective actions, and
applying the corrective actions to one or more of clocks to synchronize the clocks to a common clock rate; and
wherein the algorithm learns the skew and synchronizes the clocks to the common clock using a hybrid state-feedback comprising:
communicating the information between the nodes at communication event times;
using the information to estimate the skew of each of the clocks between the communication event times; and
at one or more of the communication event times, adjusting a clock rate of one or more of the clocks using the skew so that the clocks are synchronized to the common clock rate.

18. The method of claim 17, wherein the computers synchronize the clocks by modeling the network as a hybrid system H comprising data and using the algorithm to generate the data:

$$\mathcal{H} : \begin{cases} \dot{x} = f(x) \\ x^+ = g(x) \end{cases}$$

wherein:
x is a system state representing the skew of the clocks,
$x^+$ is the system state after a jump obtained from the information at the communication event times and g(x) is a function describing how the system state is impulsively updated at the communication event times,
$\dot{x}$ is the time rate of change of the system state determined by the algorithm between the communication event times and f(x) is a function describing the continuous time evolution of the system state between the communication event times, and
the algorithm determines the corrective action required to achieve a maximal solution to the hybrid system wherein the skew of the clocks converges to zero and the clock rates of the clock converge to the common clock rate with exponential stability.

19. The method of claim 18, comprising a plurality n of the clocks, wherein:
n is an integer such that n >1,
the nodes comprise n nodes each connected to one of the clocks each identified with an integer i such that 1≤i≤n, each of the clocks connected to the $i^{th}$ node identified as the $i^{th}$ clock having a clock rate $\tau_i$ varying as a function of time according to a drift $a_i$;
one or more of the nodes connected to the $i^{th}$ node are identified with an integer k such that 1≤k≤i, each of the clocks connected to the $k^{th}$ node identified as the $k^{th}$ clock having a clock rate $\tau_k$ varying as a function of time according to a drift $a_k$; and the one or more computers:
   implement a plurality of adjustable clocks each identified with the integer i or the integer k so that the $i^{th}$ adjustable clock is connected to the $i^{th}$ clock and one or more $k^{th}$ adjustable clocks are connected the $i^{th}$ adjustable clock, the $i^{th}$ adjustable clock having an adjustable clock rate $\tilde{\tau}_i = a_i + u_i$ where $u_i$ is a control input and the $k^{th}$ adjustable clock having an adjustable clock rate $\tilde{\tau}_k$;
   represent the network using a digraph comprising the plurality i of the nodes,
   provide feedback comprising, at each of the i nodes:
      receiving, at each of the communication event times, the $\tilde{\tau}_k$ from each of the k adjustable clocks connected to the $i^{th}$ node according to the digraph;
      updating, at the plurality of communication event times, the system state and a control variable $\eta_i$, wherein the control variable $\eta_i$ is associated with $\Sigma \hat{\tau}_i - \tilde{\tau}_k$ over all k nodes connected according to the digraph;
      determining a time rate of change of the system state using a continuous-time linear function between the communication event times to obtain an estimate $\hat{a}_i$ of the drift $a_i$ of the $i^{th}$ clock; and
   at each of the communication event times and for one or more of the i clocks (1≤i≤n), determine the one of the corrective actions $u_i = \eta_i - \hat{a}_i + \sigma^*$ applied to the clock rate $\tau_i$ of the $i^{th}$ clock that reduces the drift a, so as to converge the clock rate $\tau_i$ to the common clock rate $\sigma^*$.

* * * * *